(12) United States Patent
Ogasawara

(10) Patent No.: US 11,627,251 B2
(45) Date of Patent: Apr. 11, 2023

(54) IMAGE PROCESSING APPARATUS AND CONTROL METHOD THEREOF, COMPUTER-READABLE STORAGE MEDIUM

(71) Applicant: CANON KABUSHIKI KAISHA, Tokyo (JP)

(72) Inventor: Taku Ogasawara, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/231,036

(22) Filed: Apr. 15, 2021

(65) Prior Publication Data

US 2021/0235014 A1 Jul. 29, 2021

Related U.S. Application Data

(63) Continuation of application No. PCT/JP2019/035950, filed on Sep. 12, 2019.

(30) Foreign Application Priority Data

Oct. 26, 2018 (JP) .............................. JP2018-202077

(51) Int. Cl.
  *H04N 5/232* (2006.01)
  *H04N 5/247* (2006.01)
(52) U.S. Cl.
  CPC ... *H04N 5/23238* (2013.01); *H04N 5/232945* (2018.08); *H04N 5/247* (2013.01)
(58) Field of Classification Search
  CPC ......... H04N 5/23216; H04N 5/232933; H04N 5/23238
  See application file for complete search history.

(56) References Cited

U.S. PATENT DOCUMENTS

| 10,356,393 | B1 * | 7/2019 | Binns ...................... G06T 15/00 |
| 10,602,059 | B2 * | 3/2020 | Beers ...................... G06T 7/344 |
| 2003/0122949 | A1 * | 7/2003 | Kanematsu .......... H04N 21/443 |
| | | | 348/E7.086 |

(Continued)

FOREIGN PATENT DOCUMENTS

| JP | 2006-352539 A | 12/2006 |
| JP | 2010020487 A | 1/2010 |

(Continued)

OTHER PUBLICATIONS

International Search Report issued by the Japan Patent Office dated Dec. 3, 2019 in corresponding International Application No. PCT/JP2019/035950, with English translation.

(Continued)

*Primary Examiner* — Boubacar Abdou Tchoussou

(74) *Attorney, Agent, or Firm* — Carter, DeLuca & Farrell LLP

(57) ABSTRACT

An image processing apparatus comprises an image obtaining unit that obtains a plurality of images based on image capturing performed by a plurality of image capture apparatuses that perform image capturing of an imaging region from directions that are different to each other, and a panoramic image generating unit that generates a panoramic image with a specific position in the imaging region being a reference, based on a plurality of images obtained by the image obtaining unit.

20 Claims, 14 Drawing Sheets

(56) References Cited

U.S. PATENT DOCUMENTS

| | | | |
|---|---|---|---|
| 2004/0130501 A1* | 7/2004 | Kondo | H04N 5/23238 |
| | | | 345/1.1 |
| 2009/0237403 A1* | 9/2009 | Horii | G06T 19/00 |
| | | | 715/848 |
| 2014/0340404 A1* | 11/2014 | Wang | H04N 13/279 |
| | | | 345/427 |
| 2016/0044240 A1* | 2/2016 | Beers | G06T 7/344 |
| | | | 348/36 |
| 2018/0007387 A1* | 1/2018 | Izumi | H04N 19/39 |
| 2018/0338083 A1* | 11/2018 | Trevor | H04N 5/247 |
| 2018/0359427 A1* | 12/2018 | Choi | H04N 21/2387 |
| 2019/0364265 A1* | 11/2019 | Matsunobu | H04N 13/282 |
| 2021/0056662 A1 | 2/2021 | Ogasawara | |

FOREIGN PATENT DOCUMENTS

| | | |
|---|---|---|
| JP | 2017-005339 A | 1/2017 |
| JP | 2017-69787 A | 4/2017 |
| JP | 2018-46448 A | 3/2018 |
| JP | 2018092580 A | 6/2018 |
| JP | 2018133063 A | 8/2018 |
| JP | 2018157578 A | 10/2018 |
| WO | 2016/140060 A1 | 9/2016 |
| WO | 2017/150394 A1 | 9/2017 |

OTHER PUBLICATIONS

Notice of Reasons for Refusal issued by the Japan Patent Office dated Aug. 26, 2022 in corresponding JP Patent Application No. 2018-202077, with English translation.

* cited by examiner

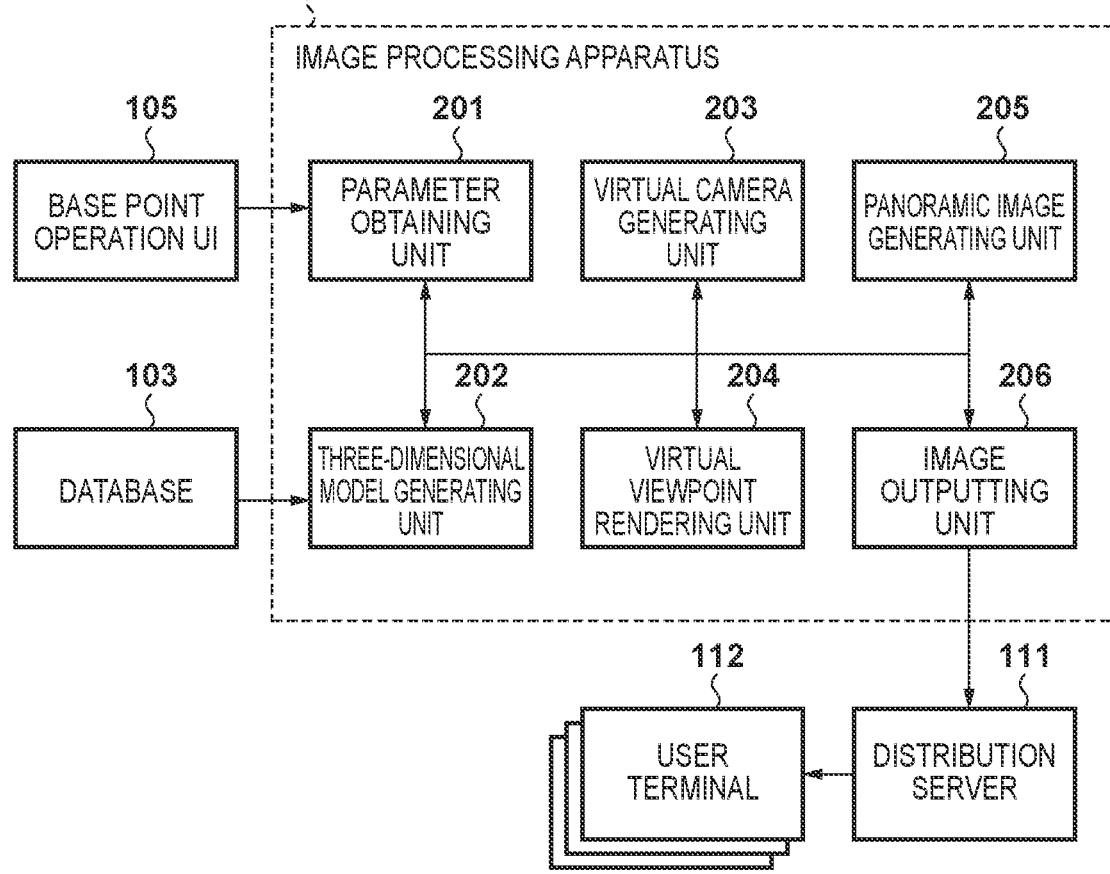
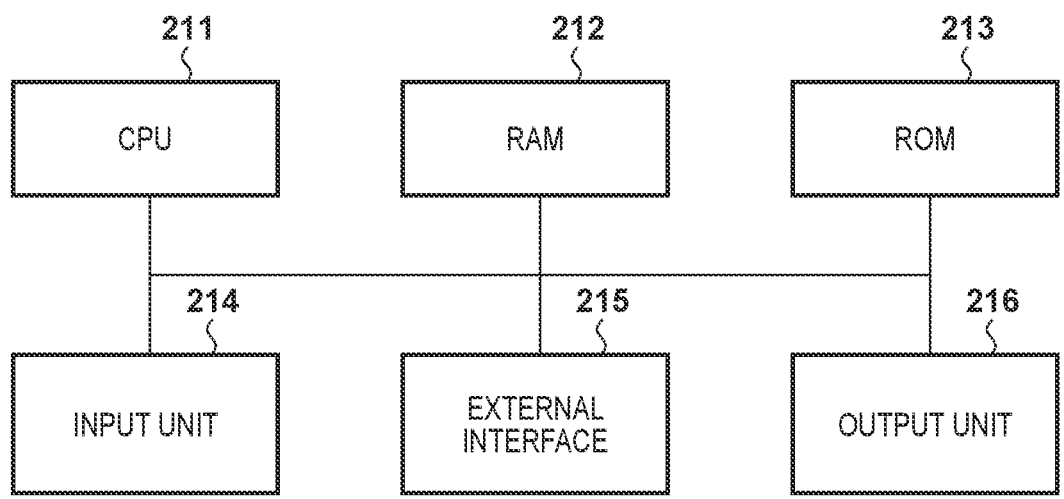

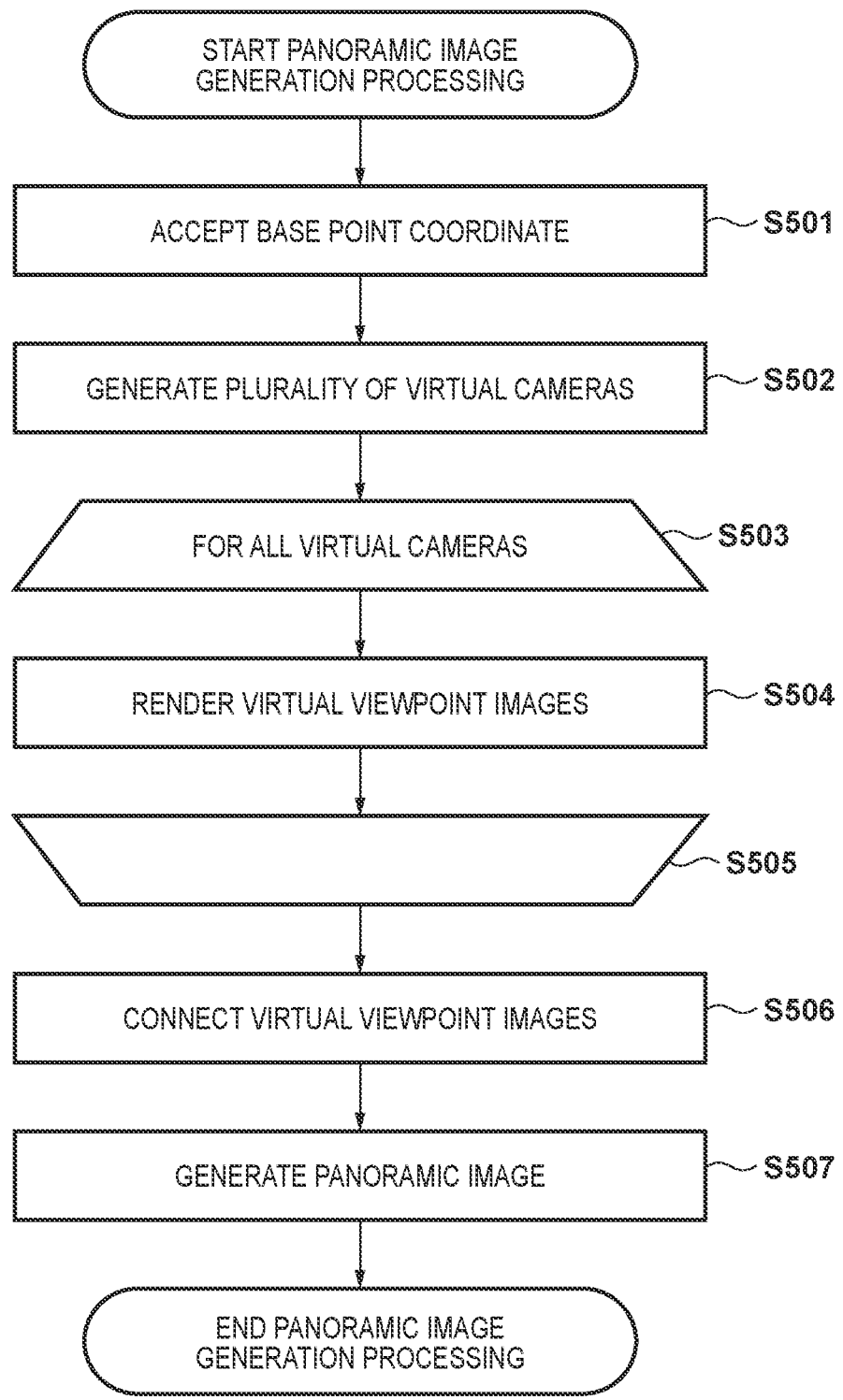

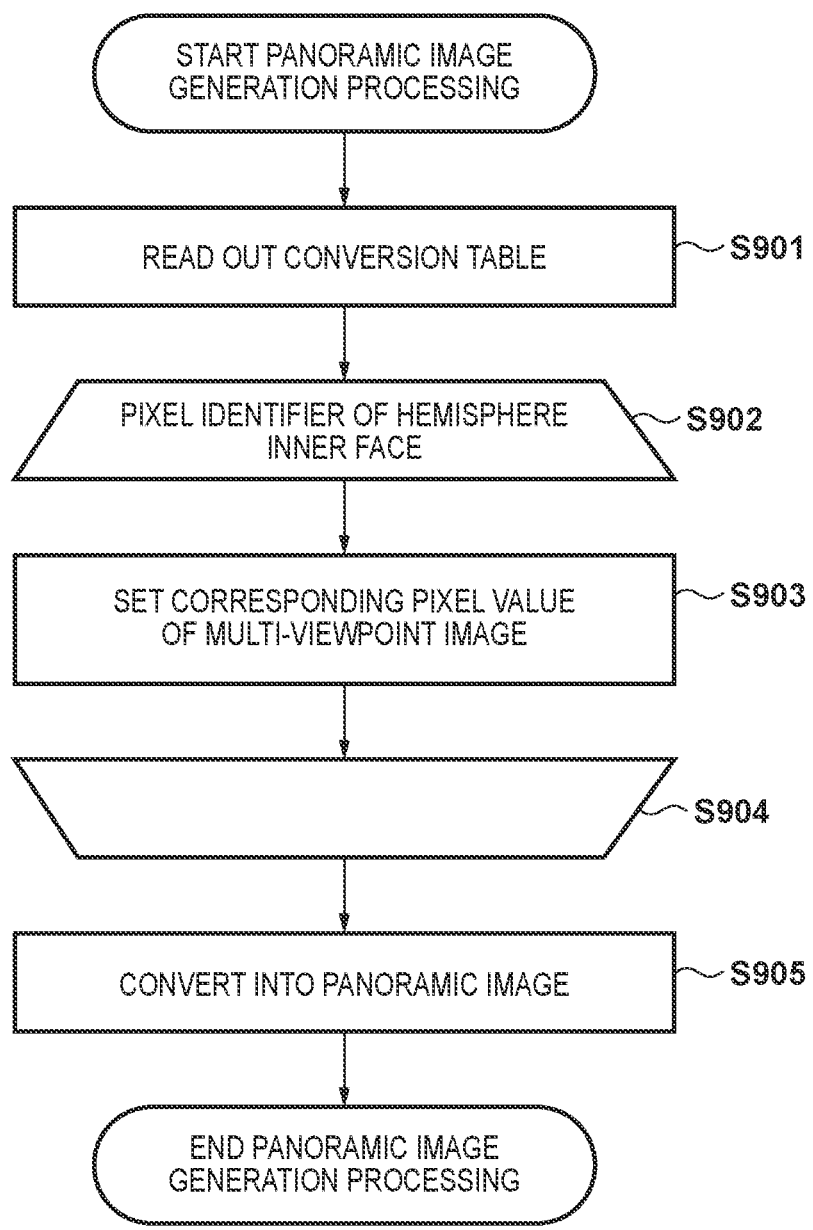

IMAGE PROCESSING APPARATUS AND CONTROL METHOD THEREOF, COMPUTER-READABLE STORAGE MEDIUM

CROSS-REFERENCE TO RELATED APPLICATIONS

This application is a Continuation of International Patent Application No. PCT/JP2019/035950, filed Sep. 12, 2019, which claims the benefit of Japanese Patent Application No. 2018-202077, filed Oct. 26, 2018, both of which are hereby incorporated by reference herein in their entirety.

BACKGROUND

Field

The present disclosure relates to an image processing apparatus and a control method thereof, and a computer-readable storage medium.

Background Art

Panoramic images in which images in a range of 360 degrees at maximum can be freely viewable have been attracting attention. A panoramic image includes images in a range wider than the range to be displayed in a display apparatus, and a viewer can select an image in any direction in the panoramic image at the time of reproduction. Note that, in this specification, the notation of image includes an image (still image) constituted by one frame and a moving image or a video that is constituted by a plurality of frames.

PTL 1 discloses a technique for generating a panoramic image and clipping its partial region. In PTL 1, image capturing is performed using an image capture apparatus in which wide angle lenses are provided in a front face and a back face, and a panoramic image is generated in which the location at which the image capture apparatus is placed is a base point. Here, the base point is a reference position regarding the generation of a panoramic image. For example, in the case of a panoramic image in which a scenery of 360 degrees is the subject, its central position is the base point.

CITATION LIST

Patent Literature

PTL 1: Japanese Patent Laid-Open No. 2017-005339

However, in PTL 1, only a panoramic image in which the position of an image capture apparatus is the base point can be generated. Therefore, it is difficult to generate and view a panoramic image in which a location at which an image capture apparatus cannot be easily installed is the base point. For example, it is difficult to bring, in the middle of a soccer game or the like in a stadium, an image capture apparatus for obtaining a panoramic image into a field in which the game is being performed, because the game is possibly interfered. Therefore, it is difficult to generate or view a panoramic image in which a position immediately in front of a player in a field in the middle of a game or the like is the base point.

SUMMARY

One embodiment of the present disclosure provides a technique for providing a panoramic image with higher degree of freedom.

According to one embodiment of the present disclosure, there is provided an image processing apparatus, including: an image obtaining unit configured to obtain a plurality of images based on image capturing performed by a plurality of image capture apparatuses that perform image capturing of an imaging region from directions that are different to each other; and a panoramic image generating unit configured to generate a panoramic image with a specific position in the imaging region being a reference, based on a plurality of images obtained by the image obtaining unit.

According to another embodiment of the present disclosure, there is provided a control method of an image processing apparatus, including: obtaining a plurality of images based on image capturing performed by a plurality of image capture apparatuses that perform image capturing of an imaging region from directions that are different to each other; and generating a panoramic image with a specific position in the imaging region being a reference, based on a plurality of images obtained in the obtaining.

According to one embodiment of the present disclosure, there is provided a non-transitory computer-readable storage medium storing a program for causing a computer to execute a control method of an image processing apparatus, including: obtaining a plurality of images based on image capturing performed by a plurality of image capture apparatuses that perform image capturing of an imaging region from directions that are different to each other; and generating a panoramic image with a specific position in the imaging region being a reference, based on a plurality of images obtained in the obtaining.

Further features of the present disclosure will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the disclosure and, together with the description, serve to explain principles of the disclosure.

FIG. 2A is a block diagram illustrating an exemplary functional configuration of an image processing apparatus.

FIG. 2B is a block diagram illustrating an exemplary hardware configuration of the image processing apparatus.

FIG. 5 is a flowchart illustrating generating processing of a panoramic image according to a first embodiment.

FIG. 9 is a flowchart illustrating generating processing of a panoramic image according to the fifth embodiment.

DESCRIPTION OF THE EMBODIMENTS

Hereinafter, embodiments of the present disclosure will be described with reference to the accompanying drawings. Note that the embodiments described below illustrate examples of specific instances in which the present disclosure is carried out, and the invention is not limited to the described embodiments.

First Embodiment

In a first embodiment, a description will be given regarding processing for generating a plurality of virtual viewpoint images corresponding to a plurality of virtual viewpoints in which respective line of sight directions are different, based on images (multi-viewpoint image) obtained by a plurality of cameras performing image capturing of an imaging region from a plurality of different directions, and generating a panoramic image using the generated virtual viewpoint images.

Figure 11:
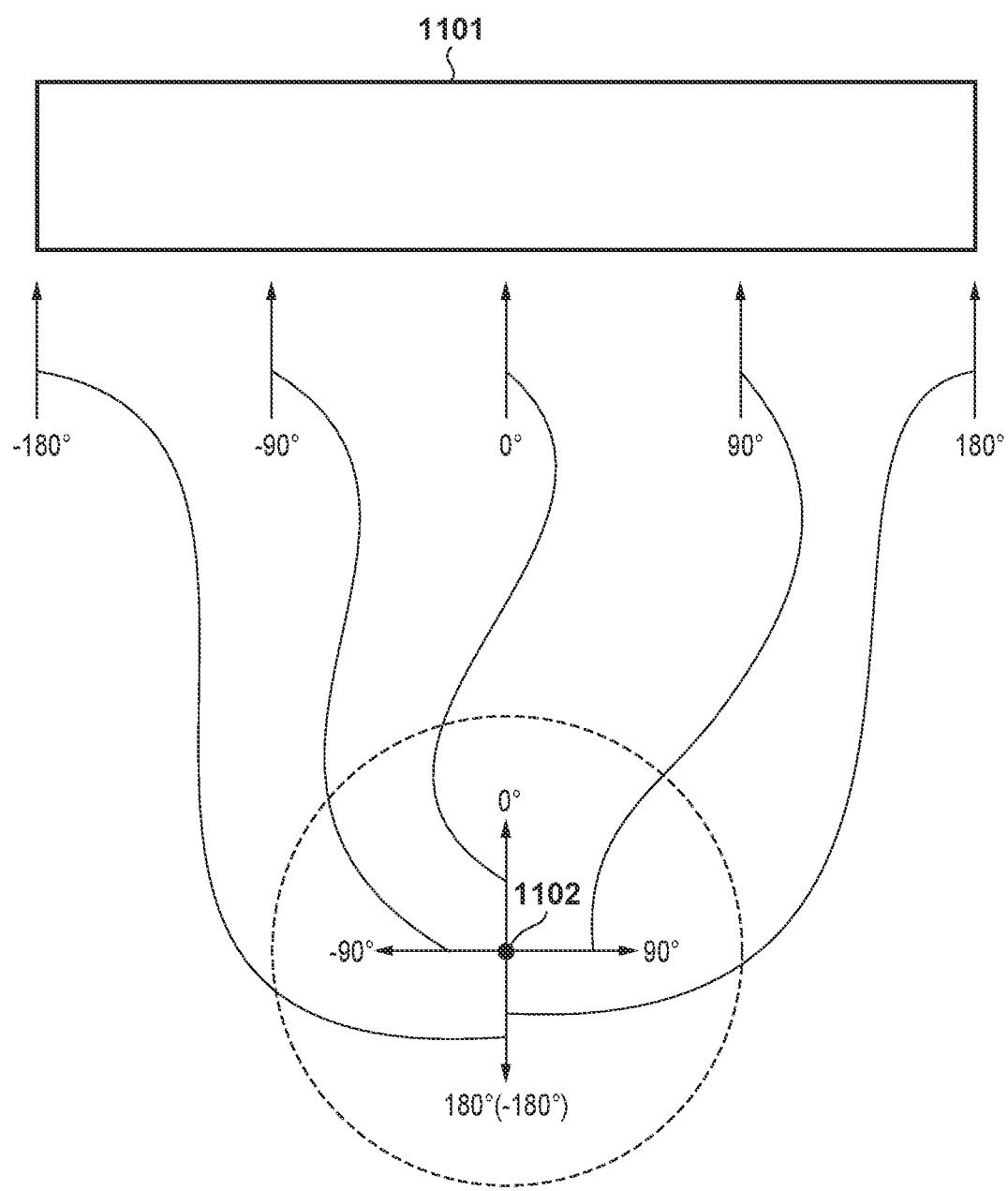
FIG. 11 is a diagram for describing a panoramic image.

First, the panoramic image to be described in this specification is defined. The panoramic image is an image including images in a plurality of line of sight directions in which the viewpoint position is a base point (reference position regarding generation of panoramic image). For example, in the case of a cylindrical panoramic image 1101 (360° image), as shown in FIG. 11, an image is obtained in which images corresponding to a plurality of line of sight directions in a range of 0° to ±180° in which a base point 1102 is the center are continuously connected. Both ends of the panoramic image 1101 are continuous, and an image in any line of sight direction in a range of 360° on a horizontal plane with the base point 1102 being the reference can be obtained. Note that the panoramic image need not correspond to a whole circumference. For example, the panoramic image may also be an image (180° panoramic image) corresponding to line of sight directions in a range of 0° to ±90°. Also, in FIG. 11, an image is illustrated in which images corresponding to a plurality of line of sight directions obtained by rotating the line of sight direction in a horizontal direction (changing azimuth angle of line of sight direction) are continuous, but the panoramic image may also be an image in which images corresponding to a plurality of line of sight directions obtained by rotating the line of sight direction in a vertical direction (changing elevation and depression angle of line of sight direction) are continuous. Also, the panoramic image may also be an image in which images corresponding to a plurality of line of sight directions obtained by three-dimensionally changing the line of sight direction are continuous, as an omnidirectional image. In a display apparatus, an image in any line of sight direction included in the range of the line of sight direction corresponding to a panoramic image can be obtained from the panoramic image. That is, the image displayed in the display apparatus is a portion of the panoramic image, and it is possible to voluntarily designate which portion of the panoramic image is to be displayed. Also, the configuration may be such that the entirety of the panoramic image can be displayed in the display apparatus.

In the following, the overall configuration of a panoramic image generating system according to the first embodiment will be described using FIGS. 1A and 1B. Also, the configuration of an image processing apparatus 104 that constitutes the panoramic image generating system will be described using FIGS. 2A and 2B. The image processing apparatus 104 performs processing for generating a panoramic image from a multi-viewpoint image. The coordinate system and virtual camera to be used in generating processing of the panoramic image will be described with reference to FIGS. 3A to 3D. Also, the processing for generating a plurality of virtual cameras (virtual viewpoints) will be described with reference to FIGS. 4A to 4D. The processing for rendering a plurality of virtual viewpoint images from a plurality of virtual cameras and generating a panoramic image by combining the virtual viewpoint images will be described using the flowchart in FIG. 5. Moreover, an exemplary generation and exemplary viewing of the panoramic image will be described with reference to FIGS. 6A to 6F.

(Configuration and Arrangement of Panoramic Image Generating System)

Figure 1A:
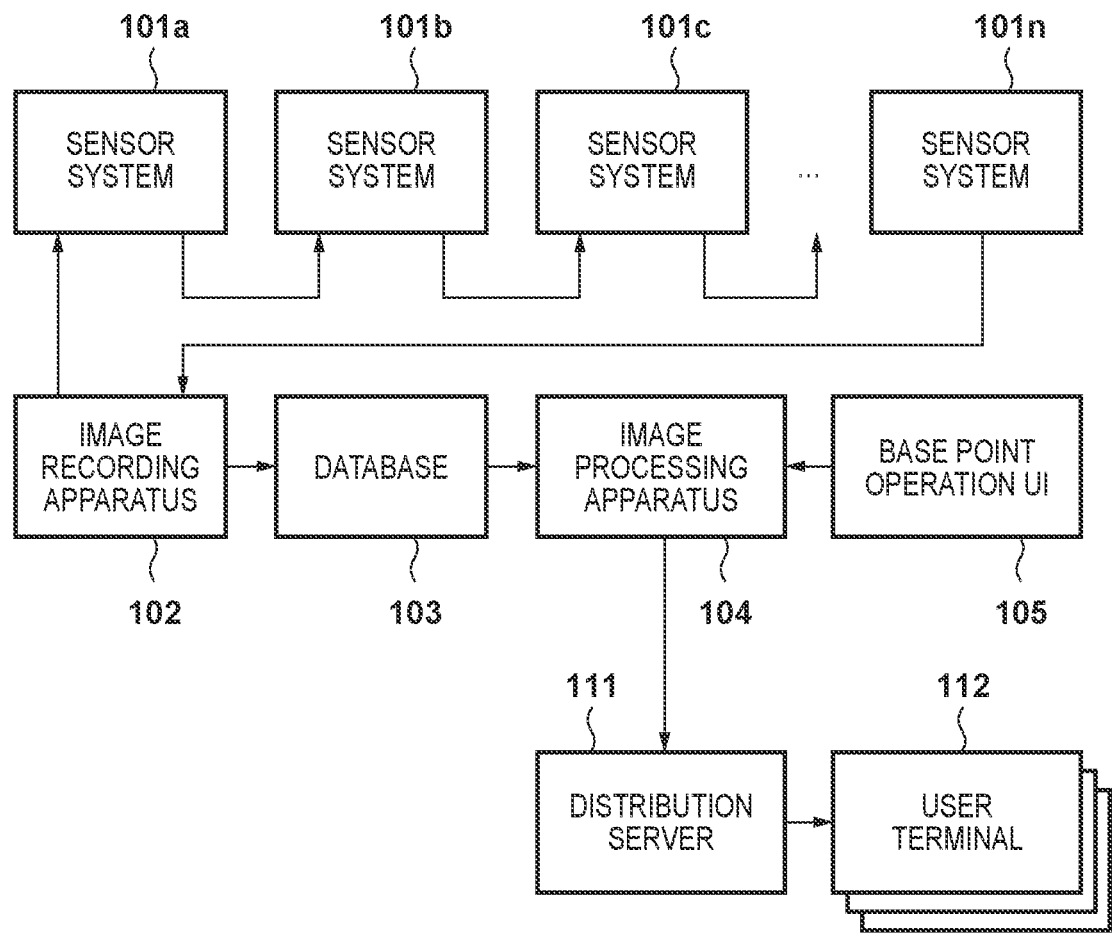
FIG. 1A is a diagram illustrating an exemplary configuration of a panoramic image generating system according to embodiments.
Figure 1B:
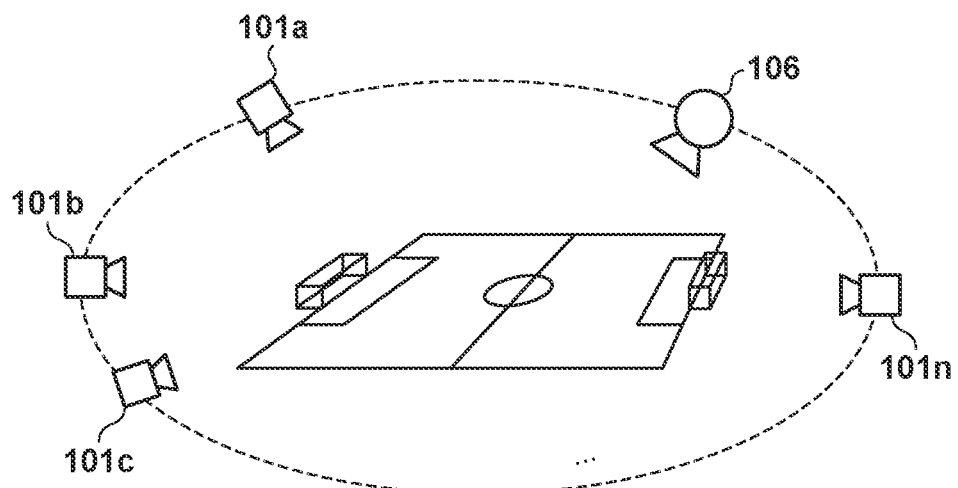
FIG. 1B is a diagram illustrating an exemplary arrangement of sensor systems and a virtual camera in the panoramic image generating system.

FIG. 1A is a block diagram for describing the panoramic image generating system in the first embodiment. The panoramic image generating system includes N sensor systems 101a, 101b, . . . , 101n, and one sensor system includes at least one camera. Note that when the N sensor systems 101a, 101b, . . . , 101n do not need to be specifically distinguished, a notation of sensor system 101 is used. The sensor systems 101 are installed so as to surround an imaging region. An exemplary installation of the sensor systems 101 is shown in FIG. 1B. In the example in FIG. 1B, the field of a stadium is the imaging region, and N sensor systems 101 are installed so as to surround the field. Note that it is needless to say that the installation place of the panoramic image generating system is not limited to a stadium, and the panoramic image generating system can also be installed in a studio, for example.

The sensor systems 101 each include an image capture apparatus (camera) and a microphone (not illustrated). The cameras of the sensor systems 101 perform image capturing of the imaging region in a synchronized manner. The set of a plurality of images obtained by synchronized image capturing performed by a plurality of cameras is called as a multi-viewpoint image. Also, the microphones of the sensor systems 101 collect sound in a synchronized manner. Note that, in the present embodiment, although the description regarding sound is partially omitted in order to simplify the description, it is assumed that the image and sound are basically processed together. The image recording apparatus 102 obtains a multi-viewpoint image and sound from the sensor systems 101, and writes them into a database 103. The image processing apparatus 104 generates a virtual viewpoint image by a virtual camera 106 from the multi-viewpoint image written into the database 103.

The virtual camera is a virtual camera that is different from the plurality of image capture apparatuses that are actually installed around the imaging region, and is a concept for conveniently describing a virtual viewpoint regarding generation of a virtual viewpoint image. That is, the virtual viewpoint image is regarded as an image obtained by image capturing performed from a virtual viewpoint set in a virtual space associated with the imaging region. Also, the position and orientation of the viewpoint in the virtual image capturing can be represented as a position and orientation of the virtual camera. In other words, the virtual viewpoint image can be said as an image that, when it is assumed that a camera is present at a position of the virtual viewpoint set in the space, simulates the image to be obtained by image capturing performed by the camera. Note that it is not essential to use the concept of the virtual camera in order to realize the configuration of the present embodiment. That is, it is sufficient that at least information indicating a specific position in a space and information indicating the orientation are set, and a virtual viewpoint image is generated in accordance with the set information. Note that the virtual camera will be described later with reference to FIGS. 3A to 3D. Also, the virtual viewpoint image will be described later with reference to FIGS. 4A to 6F.

A base point operation UI 105 provides a user interface for operating and setting the base point of a panoramic image. The operation of the base point is at least changing of the coordinates (base point coordinates) of the base point. In the present embodiment, a coordinate value input from a keyboard is used, for example. Note that examples in which a tablet and a joystick are respectively used will be described in a second embodiment and a third embodiment. The coordinate value input in the first embodiment is input values of components (x, y, z) of a coordinate system shown in FIG. 3A. The coordinate value can be input using a keyboard (numeric key), for example. Note that a configuration may be adopted in which the coordinate value is read out from a file or a memory, and the read-out value is used as the base point coordinate, without performing coordinate value input. The image processing apparatus 104 accepts information regarding the base point of the panoramic image (including base point coordinate) from the base point operation UI 105, and generates a panoramic image based on the accepted information. Specifically, the image processing apparatus 104 generates a plurality of virtual viewpoint images to be obtained by a plurality of virtual cameras that are arranged at the accepted base point coordinate, using a multi-viewpoint image obtained from a plurality of cameras that are arranged so as to surround the imaging region, and generates a panoramic image by combining the generated virtual viewpoint images. The processing performed by the image processing apparatus 104 will be described later with reference to FIGS. 2A to 6F.

The image processing apparatus 104 transmits the generated panoramic image to a distribution server 111. The distribution server 111 distributes the panoramic image to a plurality of user terminals 112 such as a smartphone and a tablet. A user views the panoramic image from a preferred direction using the user terminal 112. The exemplary viewing of a panoramic image will be described later with reference to FIGS. 6E and 6F.

(Configuration of Image Processing Apparatus)

The functional configuration of the image processing apparatus 104 according to the present embodiment will be described with reference to FIG. 2A. A parameter obtaining unit 201 accepts information regarding the base point of a panoramic image from the base point operation UI 105. The information regarding the base point includes a base point coordinate of the panoramic image, for example. The coordinate system used for the base point coordinate will be described later with reference to FIG. 3A. Also, an example of the base point coordinate of a panoramic image will be described later with reference to FIG. 3B. A virtual camera generating unit 203 generates a plurality of virtual cameras using the base point coordinate obtained by the parameter obtaining unit 201. The processing for generating a plurality of virtual cameras will be described later with reference to FIGS. 4A to 4D. A three-dimensional model generating unit 202 generates a three-dimensional model representing the three-dimensional shape of an object in the imaging region, based on the multi-viewpoint image obtained from the database 103. The three-dimensional model is generated using a shape estimation method such as Visual Hull, and is constituted by a point group.

A virtual viewpoint rendering unit 204 generates and renders virtual viewpoint images to be observed from a position that is the base point of the panoramic image, based on the multi-viewpoint image. The virtual viewpoint rendering unit 204 of the first embodiment renders virtual viewpoint images based on the position and the orientation of the virtual camera using the three-dimensional model generated by the three-dimensional model generating unit 202. Specifically, the virtual viewpoint rendering unit 204 selects a multi-viewpoint image for each point that constitutes the three-dimensional model, and performs coloring processing by obtaining an appropriate pixel value from the multi-viewpoint image. Also, the virtual viewpoint rendering unit 204 generates the virtual viewpoint image by arranging the points subjected to the coloring processing in a three-dimensional space and projecting the points onto the virtual camera.

A panoramic image generating unit 205 generates a panoramic image to be observed from the base point based on the rendered virtual viewpoint image. In the present embodiment, the panoramic image generating unit 205 instructs the virtual camera generating unit 203 to generates a plurality of virtual cameras, and instructs the virtual viewpoint rendering unit 204 to perform processing for rendering virtual viewpoint images of the number corresponding to the number of the virtual cameras. Also, the panoramic image generating unit 205 performs processing for generating the panoramic image (hereinafter, panoramic image generation processing) using the plurality of virtual viewpoint images generated by the virtual viewpoint rendering unit 204. The panoramic image generation processing will be described later with reference to FIGS. 4A to 6F. The image outputting unit 206 transmits the generated panoramic image to the distribution server 111. The plurality of user terminals 112 receive the panoramic image from the distribution server 111, and the users view the panoramic image.

Exemplary viewing of the panoramic image will be described later with reference to FIGS. 6A to 6F.

Next, the hardware configuration of the image processing apparatus 104 will be described. FIG. 2B is a hardware configuration diagram of the image processing apparatus 104.

A CPU (Central Processing Unit) 211 executes various types of processing using programs and data that are stored in a RAM (Random Access Memory) 212 and a ROM (Real Only Memory) 213. The CPU 211 executes overall operation control of the image processing apparatus 104 and processing shown in the flowchart in FIG. 5, for example. The ROM 213 retains programs and data. The RAM 212 includes a work area for temporarily storing a program and data read out from the ROM 213. Also, the RAM 212 provides a work area to be used by the CPU 211 when executing various types of processing.

An input unit 214 accepts input information from the base point operation UI 105, for example. An external interface 215 performs transmission and reception of information with the database 103 and the base point operation UI through a LAN (Local Area Network), for example. For example, the external interface 215 transmits a panoramic image to the distribution server 111 via the Ethernet (registered trademark). An output unit 116 is constituted, for example, by a display, a speaker, or the like, and outputs a generated virtual viewpoint image/panoramic image, an operation UI, and the like, as information necessary for an operator operation.

(Base Point Coordinate of Panoramic Image and Virtual Camera)

The base point coordinate of a panoramic image and the virtual camera will be described. First, the coordinate system and the base point coordinate of a panoramic image will be described with reference to FIGS. 3A and 3B. Also, the virtual camera of the present embodiment will be described with reference to FIGS. 3C and 3D.

Figure 3A:
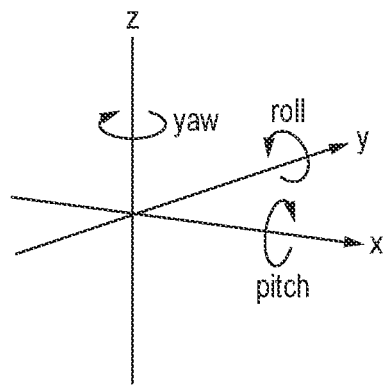
FIG. 3A is a diagram for describing a base point coordinate of a panoramic image.
Figure 3B:
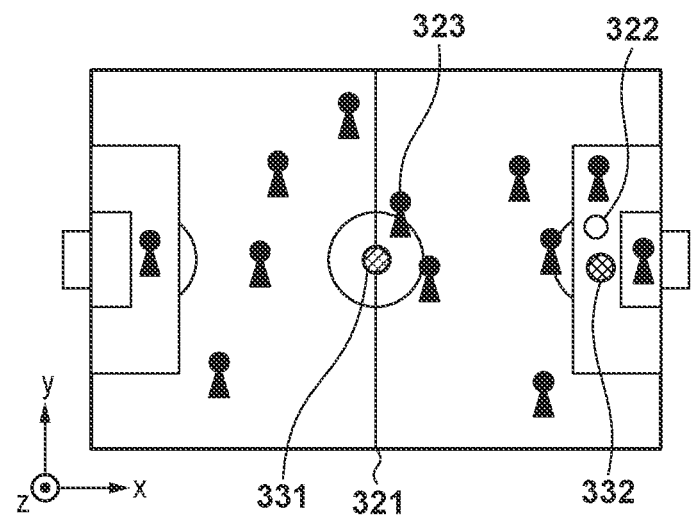
FIG. 3B is a diagram for describing a base point coordinate of a panoramic image.

First, the coordinate system will be described. The coordinate system is shown in FIG. 3A. In the present embodiment, a rectangular coordinate system with x axis/y axis/z axis in a three-dimensional space is used, as shown in FIG. 3A. This coordinate system is set in an imaging region. The imaging region is a field 321 of a stadium in which subjects such as a ball 322 and a player 323 are positioned, as shown in FIG. 3B, for example. Regarding the coordinate system, the origin (0, 0, 0) is set to the center of the field 321, the x axis is set in a long side direction of the field 321, the y axis is set in a short side direction of the field 321, and the z axis is set in a vertical direction relative to the field. Note that the directions of the axes are not limited thereto.

The base point coordinate of a panoramic image is designated by the base point operation UI 105 using the coordinate system in FIG. 3A. The position of the base point to be designated is a position regarding which a virtual viewpoint image can be generated with the position being the viewpoint position, that is, a position inside the imaging region captured by the plurality of cameras. In the first embodiment, an input coordinate value or a fixed coordinate value is used. For example, a coordinate 331 in the vicinity of the center circle of the field 321 and a coordinate 332 in the vicinity of the frontal region of the goal are designated as the base point coordinate by inputting a coordinate value.

Figure 3C:
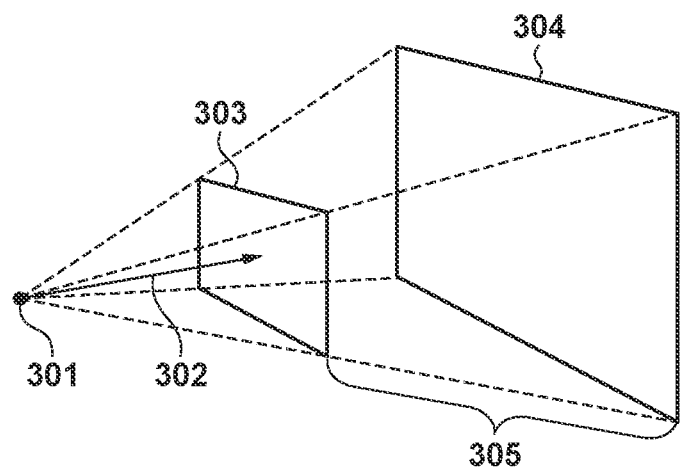
FIG. 3C is a diagram for describing a virtual camera.

Next, the virtual camera will be described with reference to FIG. 3C. In a quadrangular pyramid shown in FIG. 3C, the apex indicates a position 301 of the virtual camera, and the vector in a line of sight direction with the apex being the origin indicates an orientation 302 of the virtual camera. The position of the virtual camera is represented by axis components (x, y, z), and the orientation is represented by a unit vector with the axis components being scalars. It is assumed that the orientation 302 of the virtual camera passes through the central points of a near clipping plane 303 and a far clipping plane 304. Also, the view frustum of the virtual camera that is the range to be projected onto a virtual viewpoint image by the virtual viewpoint rendering unit 204 (that is the range of generation target of a virtual viewpoint image) is a space 305 sandwiched between the near clipping plane 303 and the far clipping plane.

Figure 3D:
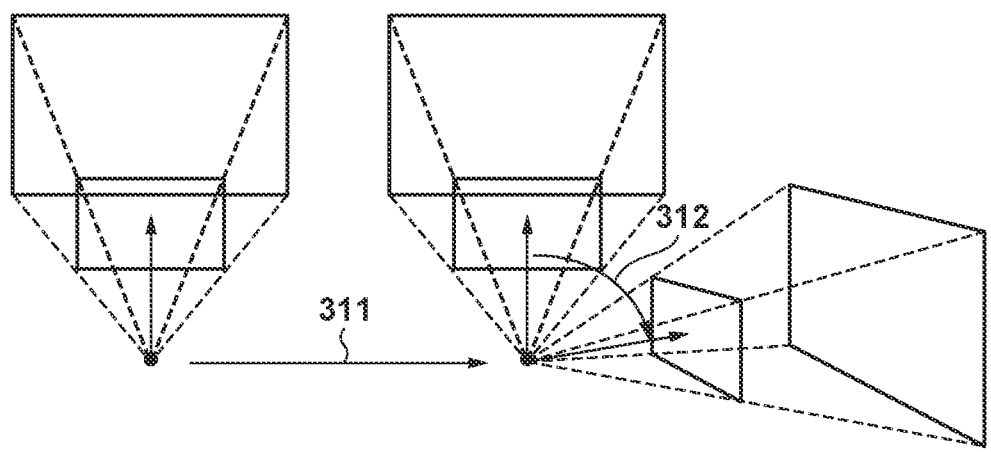
FIG. 3D is a diagram for describing a virtual camera.

Next, the movement and rotation of the virtual camera will be described with reference to FIG. 3D. The virtual camera moves and rotates in a space represented by three-dimensional coordinates. A movement 311 of the virtual camera is a movement of the position 301 of the virtual camera, and is represented by axis components (x, y, z). The rotation 312 of the virtual camera is represented by a yaw that is a rotation about the z axis, a pitch that is a rotation about the x axis, and a roll that is a rotation about the y axis, as shown in FIG. 3A.

(Processing for Generating Plurality of Virtual Cameras)

The processing for generating a plurality of virtual cameras will be described with reference to FIGS. 4A to 4D. The virtual camera generating unit 203 receives a base point coordinate of a panoramic image from the base point operation UI 105 via the parameter obtaining unit 201, and generates a plurality of virtual cameras based on the received base point coordinate. In the present embodiment, the virtual camera generating unit 203 generates six virtual cameras, as described in FIGS. 4A to 4D, in order to generate a panoramic image of 360 degrees. The panoramic image generating unit 205 generates a panoramic image corresponding to the whole circumference of 360 degrees from images of the virtual cameras. Note that it is needless to say that the number of virtual cameras to be generated is not limited to six.

The virtual camera generating unit 203 sets the received base point coordinate of the panoramic image as the position of six virtual cameras. Also, the virtual camera generating unit 203 sets the orientations of the six virtual cameras to six directions, namely frontal, dorsal, leftward, rightward, upward, and downward, respectively. In the following, a specific description will be given.

Figure 4A:
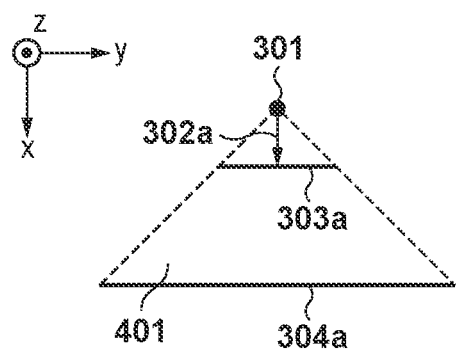
FIG. 4A is a diagram for describing processing for generating a plurality of virtual cameras.

FIG. 4A is a diagram viewing a virtual camera 401 from above (z axis). The frontal direction is defined as an x axis direction (1, 0, 0), and the vector of the orientation 302a of the virtual camera 401 is set thereto. In the coordinate system set to the field 321 that is the imaging region in FIG. 3B, the frontal direction is a right goal direction in the diagram. The coordinate of the position 301 is the base point coordinate of the panoramic moving image that is obtained by the parameter obtaining unit 201, and is the coordinate 331 or 332 shown in FIG. 3B, for example. First, the virtual camera 401 in the frontal direction is set with this base point coordinate being the position 301 of the virtual camera.

Figure 4B:
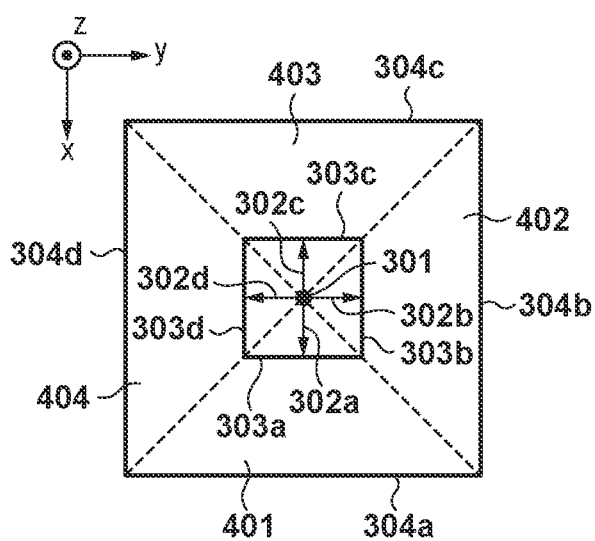
FIG. 4B is a diagram for describing processing for generating a plurality of virtual cameras.
Figure 4C:
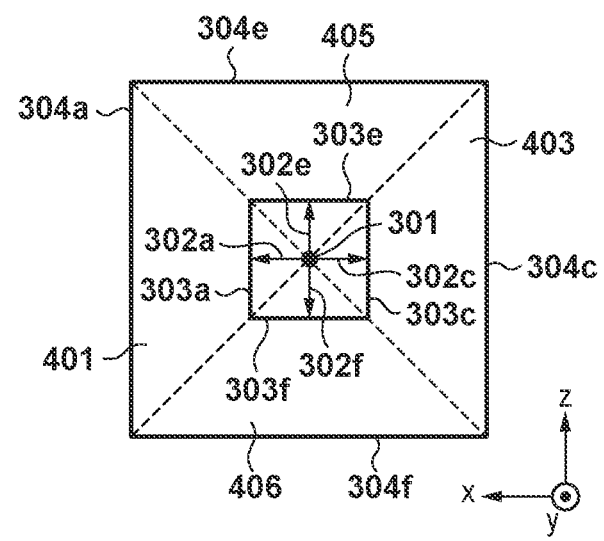
FIG. 4C is a diagram for describing processing for generating a plurality of virtual cameras.

The other five virtual cameras are arranged at the base point coordinate received via the parameter obtaining unit 201. FIGS. 4B and 4C are diagrams illustrating generation of virtual cameras in six directions. FIG. 4B is a top view (z axis), and FIG. 4C is aside view (y axis). In FIG. 4B, the virtual camera 401 in the frontal direction that is shown in FIG. 4A and other three virtual cameras 402, 403, and 404 are shown. The orientation 302b of the virtual camera 402 is the leftward direction, and is a vector of the y axis direction (0, 1, 0). The orientation 302c of the virtual camera 403 is the dorsal direction, and is a vector if the −x axis direction (−1, 0, 0). The orientation 302d of the virtual camera 404 is the rightward direction, and is a vector of the −y axis direction (0, −1, 0).

FIG. 4C is a diagram viewed in the y axis direction, and the virtual camera 401 in the frontal direction that is shown in FIG. 4A and other three virtual cameras 405, 403, and 406 are shown. Note that the virtual camera 403 is that shown in FIG. 4B. The orientation 302e of the virtual camera 405 is the upward direction, and is a vector of the z axis direction (0, 0, 1). The orientation 302f of the virtual camera 406 is the downward direction, and is a vector of the −z axis direction (0, 0, −1).

Figure 4D:
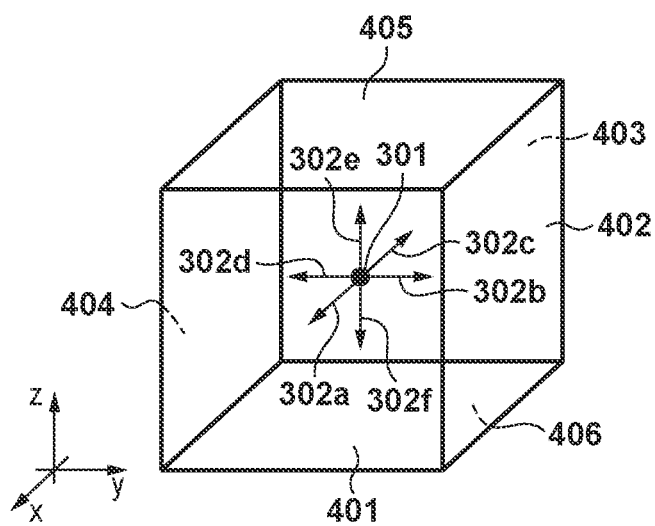
FIG. 4D is a diagram for describing processing for generating a plurality of virtual cameras.

The aforementioned six virtual cameras 401 to 406 are shown in FIG. 4D. In order to simplify the description, the position 301 and the orientations 302a to 302f of the respective virtual cameras are illustrated. When the clipping plane of the virtual camera 401 is assumed to be a square, the clipping planes of the virtual cameras 401 to 406 are respective faces of a cube, as shown in FIG. 4D. As described above, the orientations 302a to 302f of the virtual cameras 401 to 406 are respectively frontal, leftward, dorsal, rightward, upward, and downward directions.

The virtual viewpoint rendering unit 204 executes rendering processing of a plurality of virtual viewpoint images using these plurality of virtual cameras. These plurality of virtual viewpoint images to be rendered are virtual viewpoint images corresponding to a plurality of virtual viewpoints whose viewpoint positions are the same and whose line of sight directions are different (that is, a plurality of virtual viewpoints viewing in directions that are different to each other from the same specific position). Specifically, in accordance with the aforementioned six virtual cameras 401 to 406, four virtual viewpoint images corresponding to four directions that are different to each other on the horizontal plane including the base point position, and two virtual viewpoint images corresponding to two directions that are different to each other on the vertical plane including the base point position are rendered. Note that the number of virtual cameras to be generated by the virtual camera generating unit 203, and the number of virtual viewpoint images to be rendered by the virtual viewpoint rendering unit 204 are not limited to the numbers described above. For example, four virtual viewpoint images corresponding to four directions that are different to each other on the vertical plane including the base point position may be generated.

(Generating Processing of Panoramic Image)

Figure 6A:
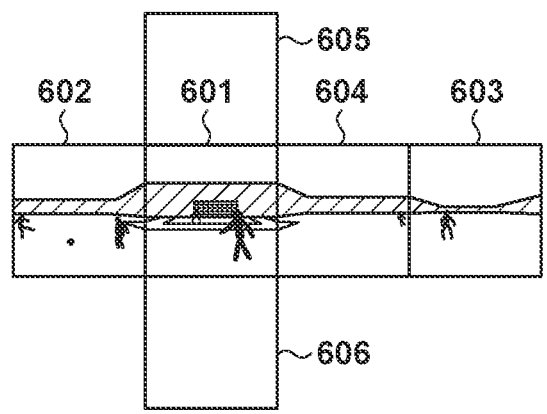
FIG. 6A is a diagram illustrating an exemplary output of a panoramic image.
Figure 6B:
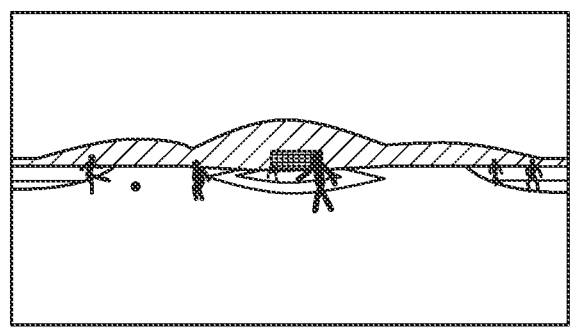
FIG. 6B is a diagram illustrating an exemplary output of a panoramic image.

Next, the generating processing of a panoramic image in the first embodiment will be described with reference to FIGS. 5 and 6A to 6F. FIG. 5 is a flowchart of the generating processing of a panoramic image. FIG. 6A illustrates a plurality of virtual viewpoint images, and FIG. 6B illustrates a panoramic image generated from the plurality of virtual viewpoint images shown in FIG. 6A.

In step S501, the panoramic image generating unit 205 obtains the base point coordinate of a panoramic image from the parameter obtaining unit 201. In this example, it is assumed that a coordinate 332 in front of a goal inside the field shown in FIG. 3B is obtained as the base point coordinate of a panoramic image. In step S502, the panoramic image generating unit 205 generates a plurality of virtual cameras from the base point coordinate obtained in step S501 using the virtual camera generating unit 203. The processing for generating a plurality of virtual cameras is as described in FIGS. 4A to 4D. In steps S503, S504, and S505, the panoramic image generating unit 205 instructs the virtual viewpoint rendering unit 204 to perform rendering processing of virtual viewpoint images of the number corresponding to the number of virtual cameras generated in step S502. The rendering processing of virtual viewpoint images by the virtual viewpoint rendering unit 204 is as described above.

In step S506, the panoramic image generating unit 205 connects the plurality of virtual viewpoint images rendered in step S504. For example, the panoramic image generating unit 205 connects the plurality of virtual viewpoint images such that each side (each end) of the plurality of virtual viewpoint images is a pixel at the same point in the imaging region. Specifically, as shown in FIGS. 4B to 4D, as a result of determining the orientations of the virtual cameras such that the plurality of virtual cameras form a cube, the net of the cube is an image in which the plurality of virtual viewpoint images are connected (FIG. 6A).

For example, in the example in which the base point coordinate is the coordinate 332, a plurality of virtual viewpoint images are connected in the manner as shown in FIG. 6A. Virtual viewpoint images 601 to 606 are images rendered using the virtual cameras 401 to 406, and respectively correspond to frontal, leftward, dorsal, rightward, upward, and downward directions. Each side of each image is a pixel at the same point in the imaging region, and each boundary is connected so as to form a continuous image.

In step S507, the panoramic image generating unit 205 generates a panoramic image from the plurality of virtual viewpoint images that are connected in step S506. In the present embodiment, the panoramic image generating unit 205 performs mapping in units of pixel from the virtual viewpoint images of six faces to the panoramic image. The format of the panoramic image is a format requested by the distribution server 111. For example, the format is that called as equidistant cylindrical projection, and a mapping table is used as the mapping in units of pixel. The method of creating the mapping table may be such that the method of mapping a spherical terrestrial globe to a planar map is applied to a six-face image, for example. Even if the base point coordinate is changed, the same mapping table can be used. Note that this mapping table may be stored in the RAM 212 or the like, in advance.

Figure 6C:
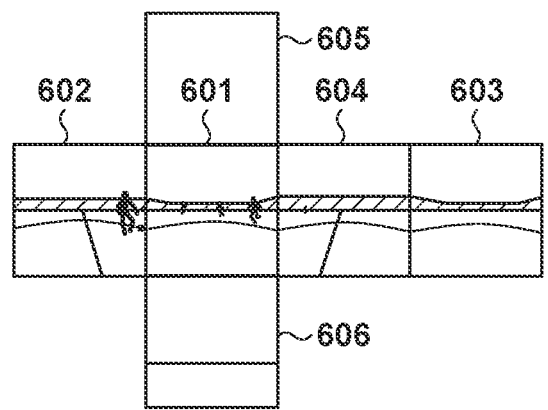
FIG. 6C is a diagram illustrating an exemplary output of a panoramic image.
Figure 6D:
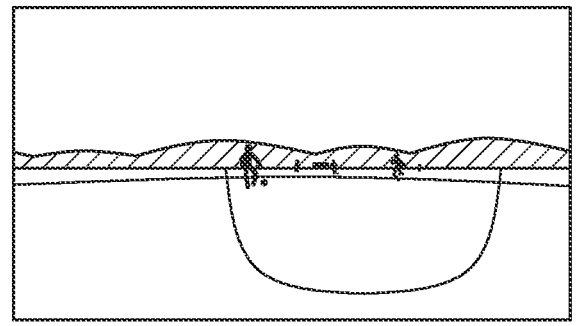
FIG. 6D is a diagram illustrating an exemplary output of a panoramic image.

The panoramic image generated from the plurality of virtual viewpoint images in FIG. 6A is as shown in FIG. 6B. In other words. FIG. 6B is a panoramic image in which the coordinate 332 in front of the goal is the base point. This panoramic image includes information regarding the whole circumference of 360 degrees in each frame, and the left end and the right end of the image are the same point and continuous. Therefore, this panoramic image is also called as a 360-degree image. Note that, regarding the example of the coordinate 331 inside the center circle inside the field, shown in FIG. 3B, as well, a panoramic image can be similarly generated. An image in which a plurality of virtual viewpoint images with the coordinate 331 being the base point are connected is shown in FIG. 6C. Also, a panoramic image generated from the image shown in FIG. 6C is shown in FIG. 6D.

As described above, according to the generating processing of a panoramic image of the first embodiment, using a multi-viewpoint image obtained by image capturing performed by a plurality of cameras that are arranged so as to surround the imaging region, a plurality of virtual viewpoint images corresponding to a plurality of virtual viewpoints that are different in line of sight direction are rendered. Also, as a result of combining these virtual viewpoint images, a panoramic image in which any position in the imaging region (e.g., a position different from the position of the image capture apparatus) is the base point can be generated.

(Viewing of Panoramic Image in User Terminal)

Exemplary viewing of a panoramic image in the user terminal 112 will be described. The panoramic image is transmitted to the distribution server 111 by the image outputting unit 206. Then, the plurality of user terminals 112 receive the panoramic image from the distribution server 111, and viewing is performed. The user terminals 112 are a tablet, a smartphone, and the like. The distribution server 111 performs streaming communication using RTMP (Real Time Message Protocol) or the like as the communication protocol, and distribution using a moving image file such as MP4, as the distribution method of the panoramic image. Note that the communication mode and the data format regarding the distribution of a panoramic image are not limited thereto.

The distribution server 111 creates a stream identifier (e.g., rtmp://football.com/live/1) for distributing the panoramic image in response to the request form a distributor. The image processing apparatus 104 connects to the identifier and transmits the panoramic image using the image outputting unit 206. A user terminal 112 connects to the identifier, and receives the panoramic image (stream). Note that the configuration may be such that the distribution server 111 embeds the stream identifier in a web page described in HTML so as to perform distribution. In this case, a user terminal 112 may access the web page and receive the panoramic image in a stream by RTMP, in the page, or may receive as a moving image file such as MP4.

As described above, the plurality of user terminals 112 can be connected to the distribution server 111 at the same time, and viewing of the panoramic image can be performed. Each user terminal 112 includes a gyrosensor and can detect the rotation of the user terminal, for example. Each user terminal 112 independently select the viewing direction in the panoramic image, in accordance with the detected rotation. That is, with the user terminals 112, the panoramic image can be viewed in any direction that is different to each other. This fact is not limited to the present embodiment, and is common in all the embodiments. Note that the designation of the viewing direction is not limited to the above (by gyrosensor).

Figure 6E:
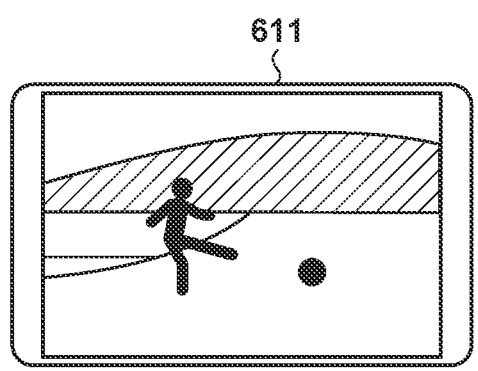
FIG. 6E is a diagram illustrating an exemplary viewing by a user terminal.
Figure 6F:
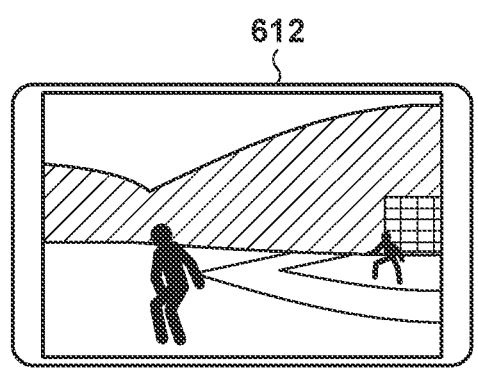
FIG. 6F is a diagram illustrating an exemplary viewing by a user terminal.

Exemplary viewing of the panoramic image in the user terminals 112 will be described with reference to FIGS. 6E and 6F. A tablet 611 and a tablet 612 that are different are used as the plurality of user terminals 112. FIG. 6E illustrates that the image processing apparatus 104 transmits the panoramic image in FIG. 6B to the distribution server 111, and the panoramic image is received and displayed by the tablet 611. Also, FIG. 6F illustrates that the same panoramic image is received and displayed by the tablet 612. FIG. 6E illustrates that a user rotates the tablet 611 and pays attention to a player who makes a shot in front of the goal. On the other hand, FIG. 6F illustrates that another user rotates the tablet 612 and pays attention to a player such as a keeper who saves the goal in front thereof. In this way, with the user terminals 112, the panoramic image can be viewed in any direction that is different to each other. Of course, with one tablet as well, the panoramic image can be viewed while changing the direction from FIG. 6E to FIG. 6F by merely performing rotation.

As described above, the panoramic image retains information regarding 360 degrees in each frame, and when the direction of the user terminal 112 is changed, it is not needed to regenerate the panoramic image. It is sufficient that each user terminal 112 uses frames of the panoramic image that have already received. Similarly, even if the data communication with the distribution server 11 is disconnected after a user terminal 112 having received the frame, with the user terminal 112, the viewing direction of the frame can be freely selected.

Note that a system is present in which one virtual viewpoint image, instead of the panoramic image, is distributed. An image can be generated at the time of generation of the virtual viewpoint image while targeting any position in the imaging region. However, when one virtual viewpoint image is distributed, a different direction cannot be selected in a plurality of user terminals after the distribution.

As described above, according to the first embodiment, a plurality of virtual viewpoint images are generated that correspond to the plurality of virtual viewpoints that are different in line of sight direction, using a multi-viewpoint image obtained by performing image capturing by a plurality of cameras that are arranged so as to surround the imaging region, and a panoramic image in which any position in the imaging region is the base point can be generated by combining the plurality of virtual viewpoint images. For example, in the middle of a sport game in a stadium, a panoramic image in which any position in the field is the base point can be generated. In the generated panoramic image, a viewer can select a preferable direction, and can view a desired player and its play in a close up manner, in the middle of the game.

Second Embodiment

In the first embodiment, a configuration has been described in which the coordinate value input by a user is set as the base point position. In a second embodiment, a configuration will be described in which a base point operation UI 105 displays a bird's-eye view image of the imaging region in a display unit, and the base point position is set based on the position designated by a user in the displayed bird's-eye image. In the second embodiment, as an example of such a configuration, a configuration will be described in which a touch panel is adopted as the display unit, and the base point of the panoramic image is designated by a touch input to the touch panel. The panoramic image generating system (FIGS. 1A and 1B), the configuration of an image processing apparatus 104 (FIGS. 2A and 2B), and each processing in the image processing apparatus 104 (FIGS. 4A to 6F), in the second embodiment, are similar to those in the first embodiment. In the second embodiment, the method of designating the base point of a panoramic image by the base point operation UI 105 is different from that in the first embodiment, and therefore the method of designating the base point will be mainly described in the following.

In the second embodiment, a device including a touch panel display is used as the base point operation UI 105. For example, a tablet is used. The base point operation UI 105 displays a bird's-eye view image of the imaging region in the touch panel display. Note that in a later-described third embodiment, a joystick is used as the base point operation UI. The joystick is generally used as the method of designating the movement and rotation in a three-dimensional space at the same time. However, with the joystick, although the movement of the virtual camera can be finely operated, the operator needs to be proficient in the simultaneous operation. In the second embodiment, the base point of a panoramic image can be designated with only a simple tap operation that does not require proficiency.

(Processing of Designating Base Point of Panoramic Image)

Figure 7A:
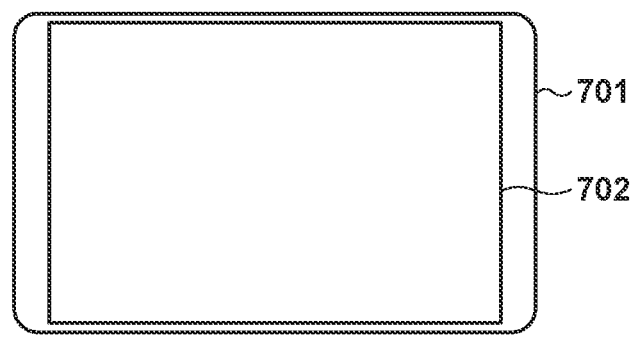
FIG. 7A is a diagram for describing processing for designating a base point of a panoramic image according to a second embodiment.

The processing of designating the base point of a panoramic image will be described with reference to FIGS. 7A to 7C. FIG. 7A shows a tablet 701 that can be used as the base point operation UI 105. The tablet 701 includes a touch panel display 702 in which a touch panel is overlaid on an LCD apparatus that can display an image. The touch panel display 702 detects a touch operation, and a position coordinate at which an operation has been performed. The touch panel display 702 regularly notifies a CPU (not illustrated) of the base point operation UI 105 of the detected touch operation and position coordinate, for example.

The CPU of the base point operation UI 105 determines what type of operation has been performed on the touch panel and determines the coordinate of the position at which the operation has been performed, based on the information notified from the touch panel display 702. For example, a fact of touching the touch panel display 702 by a finger or pen (hereinafter, referred to as touch-in), a fact that a finger or pen moves while being in touch (hereinafter, drag), a fact that a finger or pen that has been touched is removed (hereinafter, touch-out), and the like are determined as the touch operation. For example, the CPU of the base point operation UI 105 determines to be a tap operation when a touch-in and a touch-out are performed in a short period of time. Note that the touch operations to be determined are not limited to those.

Note that any type among various types such as a resistive type, a capacitive type, a surface acoustic wave type, an infrared type, an electromagnetic induction type, and an optical sensor type may be used as the touch panel of the tablet 701. Also, the tablet 701 includes a CPU/RAM and an acceleration sensor/gyrosensor in addition to the touch panel display 702, but these are hardware constituent elements of a general tablet, and therefore the description thereof is omitted.

The processing of designating the base point of a panoramic image using the tablet 701 including the touch panel display 702 will be described with reference to FIGS. 7B and 7C. The touch panel display 702 displays a bird's-eye view image 703 of the imaging region. The bird's-eye view image 703 of the imaging region has an advantage that the position can be intuitively understood.

Figure 7B:
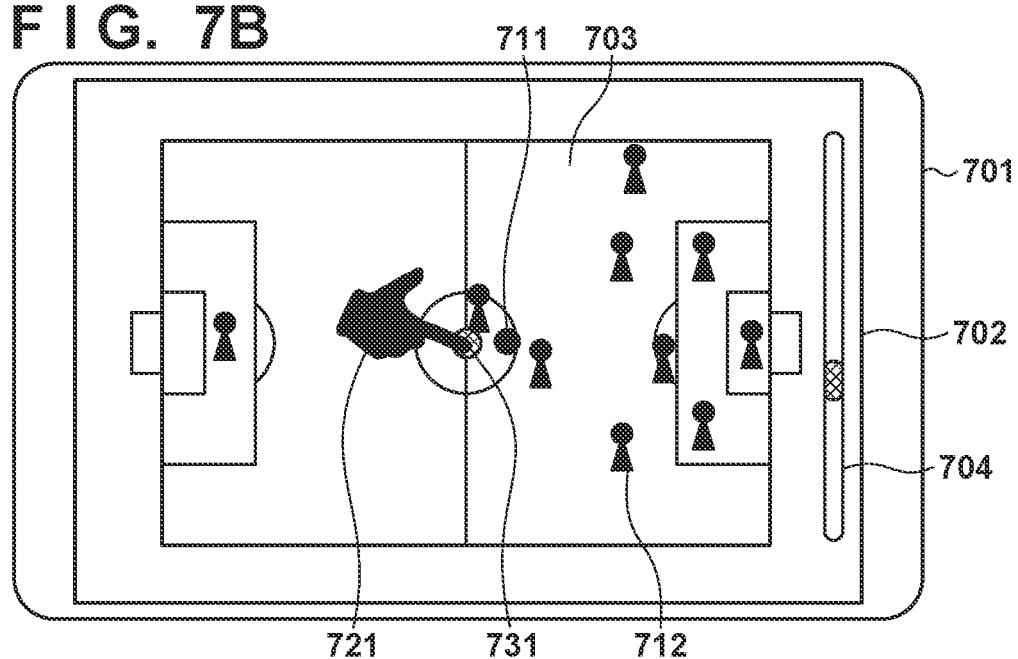
FIG. 7B is a diagram for describing processing for designating a base point of a panoramic image according to the second embodiment.
Figure 7C:
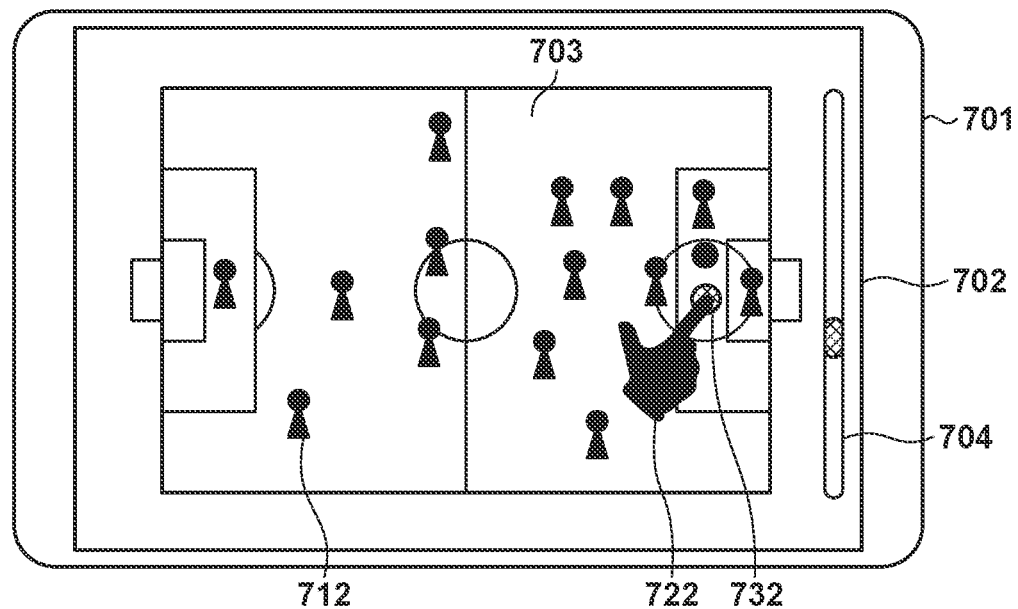
FIG. 7C is a diagram for describing processing for designating a base point of a panoramic image according to the second embodiment.

In FIGS. 7B and 7C, the imaging region is a field inside a stadium, and the bird's-eye view image 703 is an image obtained by observing the entirety of the field that is the imaging region from above. The bird's-eye view image 703 includes a ball 711 and a person 712 on the field. Note that an image shot by a camera or the like that is arranged in an upper stage of a spectator stand or a ceiling of the stadium, or a virtual viewpoint image corresponding to a virtual viewpoint that is arranged at a similar position can be used as the bird's-eye view image 703, for example.

FIG. 7B shows a case where the ball 711 is in a center circle at the center of the field, and a tap operation 721 performed on the vicinity thereof has been accepted. The tablet 701 (or, CPU) detects the tap operation 721 and a coordinate 731 of the tap position. The coordinate 731 is (x, y)=(x1, y1). The value in the z axis is designated using a slide bar 704 displayed in the touch panel display 702. For example, if the value designated by the slide bar 704 is (z)=(z1), the coordinate designated by the tap operation 721 is (x1, y1, z1). As long as the slide bar 704 is not changed, the value in the z axis does not change. Note that the configuration may be such that the value in the z axis is changed using an acceleration sensor included in the tablet 701. For example, as a result of moving the tablet 701 in the vertically upward direction, the value in the z axis is increased, and as a result of moving the tablet in the vertically downward direction, the value in the z axis is decreased. The tablet 701 notifies the image processing apparatus 104 (or, parameter obtaining unit 201 included therein) of the coordinate (x1, y1, z1) as the base point coordinate of the panoramic image.

FIG. 7C shows a manner in which a tap operation 722 that has been performed in the vicinity of the ball by a user in response to the ball 711 having moved in front of the goal has been accepted. The touch panel display 702 detects the tap operation 722 and a coordinate 732 of the tap position. For example, it is assumed that the coordinate 732 is (x, y)=(x2, y2). The slide bar 704 in FIG. 7C is assumed to remain the same as in FIG. 7B (z=z1). The tablet 701 notifies the image processing apparatus 104 (or, parameter obtaining unit 201 included therein) of the coordinate (x2, y2, z1) designated by the tap operation 722 as the base point coordinate of the panoramic image.

The image processing apparatus 104 generates a panoramic image using, as the base point, the coordinate notified from the tablet 701 that is the base point operation UI 105. The generating processing of a panoramic image is similar to the processing described in the first embodiment (FIGS. 4A to 5). Also, regarding an exemplary generation of a panoramic image as well, if it is assumed that the coordinate 731 of the tap position is the same coordinate as the coordinate 331, the panoramic image with the coordinate 731 of the tap position being the base point is the same as that shown in FIG. 6D. Similarly, if it is assumed that the coordinate 732 of the tap position is the same coordinate as the coordinate 332, the panoramic image with the coordinate 732 of the tap position being the base point is the same as that shown in FIG. 6B. Moreover, regarding the exemplary viewing of a panoramic image in a plurality of user terminals 112 as well, a description can be given similarly to that given regarding FIGS. 6E and 6F using the example of the panoramic image in FIG. 6B.

Note that, if the tapping is performed in the order from FIG. 7B to FIG. 7C, interpolation by a straight line may be performed between the coordinate 731 and the coordinate 732, and the coordinates on the line may be successively notified to the image processing apparatus 104. In this case, the image processing apparatus 104 generates panoramic images with respect to all the coordinates on the interpolation line. Accordingly, a panoramic image in which the base point smoothly moves between frames can be generated. That is, a panoramic image of a moving image corresponding to a base point that continuously moves can be generated.

As described above, according to the second embodiment, any locations in the imaging region can be successively designated as the base point of a panoramic image, only by simple tap operations performed on a bird's-eye view image of the imaging region. For example, in the middle of a soccer game, the field into which an image capture camera is difficult to be brought is set as the imaging region, and by a tap operation performed on a bird's-eye view image with which the position can be intuitively easily understood, the panoramic image can be generated with the tapped position being the base point. Also, even in a scene in which passing of a ball is rapid in soccer, if a separate position in the bird's-eye view image of the imaging region is tapped, the panoramic images can be successively generated with the tapped position being the base point.

Third Embodiment

In a third embodiment, a method is described in which a panoramic image is generated by operating one virtual camera without directly operating the base point of a panoramic image using a base point operation UI 105. In the third embodiment, a joystick is used in the base point operation UI 105, and one virtual camera is operated by using the joystick. An image processing apparatus 104 generates a plurality of virtual cameras that are different in line of sight direction by making a plurality of copies of the virtual camera with the virtual camera being the reference.

Note that, in the third embodiment, the method of generating a panoramic image from a plurality of virtual viewpoint images is similar to that in the first embodiment. Also, in the third embodiment, the configurations of a panoramic image generating system (FIGS. 1A and 1B) and an image processing apparatus (FIGS. 2A and 2B) are similar to those in the first embodiment. Moreover, regarding each processing in the image processing apparatus 104, descriptions of similar portions are omitted, and different portions will be mainly described.

The joystick is a device for designating the movement and rotation in a three-dimensional space at the same time, and the structure and the like thereof are known, and therefore the illustration thereof is omitted. As a result of using a joystick, the position and orientation of a virtual camera that is a source of a panoramic image can be finely operated. Note that a joystick is used as the base point operation UI 105 of the third embodiment, but there is no limitation thereto, and any configuration with which the position and orientation of a virtual camera can be operated may be adopted.

In the generating processing of a plurality of virtual cameras according to the first and second embodiments, the orientations of the virtual cameras (401 to 404) in frontal, leftward, dorsal, and rightward directions are limited to horizontal directions (directions parallel to XY plane), and the orientations of the virtual cameras (405/406) in upward and downward directions are limited to vertical directions. The virtual viewpoint image that is the source of panoramic images shown in FIGS. 6A to 6F uses four faces (601 to 604) in the horizontal direction, but uses only two faces (605 and 606) in the vertical direction. Therefore, the sense of resolution in a panoramic image that is generated by combining these faces is relatively high in the horizontal direction. In the third embodiment, as a result of flexibly operating the base point operation UI 105, a panoramic image can be generated without receiving these restrictions. For example, if the virtual camera that is the reference is rotated in the vertical direction by 90 degrees, a panoramic image in which the sense of resolution in the vertical direction is high can be generated.

(Virtual Camera Operation by Base Point Operation UI)

The base point operation UI 105 of the third embodiment will be described. A joystick is used as the base point operation UI 105, for example, and the movement and rotation of the virtual camera in a three-dimensional space are designated at the same time. The base point operation UI 105 notifies a parameter obtaining unit 201 of the image processing apparatus 104 of the information regarding the designated position and orientation of the virtual camera. The position and orientation, and the movement and rotation of a virtual camera are as described in the first embodiment (FIGS. 3A to 3D).

(Copying Processing of Virtual Camera)

The copying processing of a virtual camera will be described with reference to FIGS. 4A to 4D. The copying processing of a virtual camera is executed by a virtual camera generating unit 203 of the image processing apparatus 104. The virtual camera generating unit 203 obtains at least the position and orientation of a virtual camera via the parameter obtaining unit 201. Note that the focal distance or the like of a virtual camera may also be obtained, in addition thereto. The virtual camera generating unit 203 deems that the virtual camera having the obtained parameters is in a frontal direction, and generates, by copying, virtual cameras that are rotated in five direction of dorsal, rightward, leftward, upward, and downward directions with the position and direction being the reference. Note that the number of virtual cameras to be generated by copying is not limited to five.

In the following, specific description will be given. FIG. 4A shows a virtual camera 401 obtained by the parameter obtaining unit 201. FIG. 4A is a diagram viewing the virtual camera 401 from above (z axis). A position 301 and an orientation 302 of the virtual camera 401 are notified from the base point operation UI 105. FIGS. 4B and 4C are diagrams showing copies of the virtual camera FIG. 4B is a top view (z axis), and FIG. 4C is a side view (y axis). In FIG. 4B, the virtual camera 401 shown in FIG. 4A and three virtual cameras 402, 403, and 404 that are copies are shown.

The virtual cameras are copies of the virtual camera 401 at the same position as the virtual camera 401 while rotation about the z axis (Yaw direction) is performed by 90 degrees, 180 degrees, and 270 degrees, respectively. That is, when the orientation of the virtual camera 401 is in the frontal direction, the orientation direction is set as an x axis, and coordinate axes are set with the position being the origin, the virtual camera 402 is oriented rightward (y axis direction), the virtual camera 403 is oriented dorsally (−x axis direction), and the virtual camera 404 is oriented leftward (−y axis direction).

FIG. 4C shows the virtual camera 401 shown in FIG. 4A and three virtual cameras 405, 403, and 406 that are copies. The virtual camera 403 is that shown in FIG. 4B. The virtual cameras 405 and 406 are copies of the virtual camera 401 by performing rotation about the y axis (roll direction) by 90 degrees and 270 degrees, respectively, while the position being the same as the virtual camera 401. That is, when the orientation of the virtual camera 401 is the frontal direction, the virtual camera 405 is oriented upward (z axis direction), and the virtual camera 406 is oriented downward (−z axis direction). FIG. 4D shows illustrations of the six virtual cameras described above. Only the position, orientation, and far clipping plane of each virtual camera are shown in order to simplify the description.

When the clipping plane of the virtual camera 401 is square, as shown in FIG. 4D, the clipping planes of the virtual cameras 401 to 406 are respective faces of a cube. As described above, the virtual cameras 401 to 406 are respectively oriented frontal, leftward, dorsal, rightward, upward, and downward. Virtual viewpoint images that are different in line of sight direction can be obtained by executing the rendering processing of a plurality of virtual viewpoint images, which is as described in FIG. 5, using these virtual cameras. The generating processing of a panoramic image that is a combination of these virtual viewpoint images is as described in FIG. 5.

Note that, in the third embodiment, the virtual camera that is operated using the base point operation UI 105 is set in the frontal direction, but the panoramic image may also be generated such that the frontal direction is the direction firstly displayed in the user terminal 112 (line of sight direction corresponding to an initial display of the panoramic image). That is, the panoramic image generating unit 205 may also be configured to generate a panoramic image such that the direction of a virtual camera to be operated by using the base point operation UI 105 is the frontal direction of the panoramic image to be displayed first.

As described above, according to the third embodiment, as a result of using a joystick in the base point operation UI 105, the position and orientation of a virtual camera can be finely operated. Also, a plurality of virtual viewpoint images that are different in line of sight direction can be rendered with the position of a virtual camera to be operated being the base point and the line of sight direction of the virtual camera being the reference. Therefore, the inclination of a plurality of virtual viewpoint images that are obtained by coping a virtual camera to be operated, and the inclination of a panoramic image that is generated by combining the virtual viewpoint images can be freely designated.

For example, although the opportunity of being needed is not many in a case of a field sport such as soccer, because the virtual camera is mainly moved along a plane, a panoramic image in which the sense of resolution is high in the vertical direction as well can be generated in a sport in which movement is three-dimensionally performed. The pole vault and gymnastics are examples of this case. As described above, as a result of flexibly operating the base point operation UI 105 of the third embodiment, a panoramic image, in which a combination of both horizontal and vertical directions is used, that creates characteristic impression can be generated.

Fourth Embodiment

In a fourth embodiment, the base point of a panoramic image is designated using a positioning technique. In the fourth embodiment, GPS is used as the positioning technique, for example, and the position of each player is obtained in real time by attaching a positioning tag to a protector or the like that is worn by the player, in a field sport such as soccer or rugby. Here, GPS is a global positioning system. Note that because the positioning technique and the positioning tag are known, specific description thereof is omitted. Note that the positioning method is not limited to GPS. For example, a coordinate obtained from a three-dimensional model of each player generated by a three-dimensional model generating unit 202 of an image processing apparatus 104 may be used. Also, in the fourth embodiment, the configurations of a panoramic image generating system (FIGS. 1A and 1B) and an image processing apparatus (FIGS. 2A and 2B), and each processing in the image processing apparatus 104 (FIGS. 3A to 6F) are similar to those in the first embodiment.

In the first to third embodiments, the base point of a panoramic image is manually designated using the base point operation UI 105. In contrast, in the fourth embodiment, positioning tags are given to subjects such as a person and an object that are included in the imaging region, and the position information automatically obtained therefrom is designated as the base point of a panoramic image.

(Method of Designating Base Point of Panoramic Image)

A method of designating a coordinate obtained from a positioning tag given to a subject as the base point of a panoramic image will be described.

First, description will be given regarding the point of giving a positioning tag to a subject. For example, when the imaging region is a field 321 of soccer shown in FIG. 3B, positioning tags are attached to subjects such as a ball 322 and a player 323 that are included in the field, and position information thereof is obtained. The coordinate system to be used is that shown in FIGS. 3A and 3B. For example, the coordinate of the ball 322 is (x, y, z)=(x3, y3, z3), and the coordinate of the player 323 is (x, y, z)=(x4, y4, z4). The number of players to which the positioning tag is attached is not limited to one, and the positioning tag may be attached to each of a plurality of players, and the coordinate may be obtained from each positioning tag.

A base point operation UI 105 selects one piece of position information, and notifies the image processing apparatus 104 (or, parameter obtaining unit 201) of the position information as the base point coordinate of a panoramic image. For example, in order to select one piece of position information, the base point operation UI 105 includes a tablet 701 or the like including a touch panel display 702 that displays a bird's-eye view image of the imaging region, as shown in FIGS. 7A to 7C. The base point operation UI 105 accepts a touch operation performed on the bird's-eye view image 703 of the imaging region, and performs matching determination between the detected operation coordinate (e.g., coordinate 731) and the coordinates of the ball and the players. The base point operation UI 105 selects the position information of the ball or player regarding which the determination result of the matching determination is true, and makes notification of this coordinate. Note that the position obtained by moving, by a defined amount, the position obtained from a positioning tag given to a subject inside the imaging region or the obtaining position may be set to the base point position of a panoramic image. That is, as the coordinate to be notified, a coordinate value obtained by moving a coordinate value obtained from a positioning tag by a fixed amount may be notified. For example, the values obtained from a positioning tag may be used as is as the x and y coordinates, and the value shifted upward by a fixed amount may be used as the z coordinate. Note that the base point operation UI may make notification of the direction in addition to the coordinate. For example, the running direction or the face orientation of a player may be obtained from a positioning tag, and the obtained direction or orientation may be notified as the direction. Also, a panoramic image may be generated such that the direction is a direction to be displayed first in the user terminal 112 (line of sight direction corresponding to an initial display of the panoramic image).

For example, in the example in FIG. 7B, with respect to the coordinate 731 of the tap position, the matching determination with the coordinate of a player inside the center circle becomes true, and the coordinate of the player is notified to the image processing apparatus 104 as the base point coordinate of a panoramic image. Note that, if a subject with which true is determined in the matching determination is not present, the state in which position information with which true is determined in the previous matching determination is selected may be continued. Note that the operation of selecting one piece of position information as the base point coordinate of a panoramic image can be successively performed, and a ball and a player that is to be the base point coordinate of a panoramic image can be freely switched.

The processing after the image processing apparatus 104 has received the base point coordinate of a panoramic image is similar to that in the first embodiment (FIGS. 4A to 6F).

As described above, according to the fourth embodiment, a panoramic image in which a person or an object that is included in the imaging region is the base point can be obtained. For example, when the imaging region is a field in which a soccer game is being performed, a panoramic image in which a ball or a player of interest is the base point can be generated, and the panoramic image can be viewed in a user terminal at hand. Note that the method of specifying the position of an object included in the imaging region is not limited to the method described above. For example, a configuration may be adopted in which an object such as a person is detected from a multi-viewpoint image obtained by a plurality of image capture apparatuses, and the position of the object is specified.

Fifth Embodiment

In a fifth embodiment, processing will be described in which rendering (projection) is performed inside of a hemisphere using a multi-viewpoint image obtained by image capturing performed by a plurality of cameras that are arranged so as to surround the imaging region, and a panoramic image is generated from the rendered image. Note that the panoramic image generating system of the fifth embodiment is similar to that in the first embodiment (FIGS. 1A and 1B). In the following, portions that are different from the first embodiment will be mainly described.

(Configuration of Image Processing Apparatus)

Figure 8:
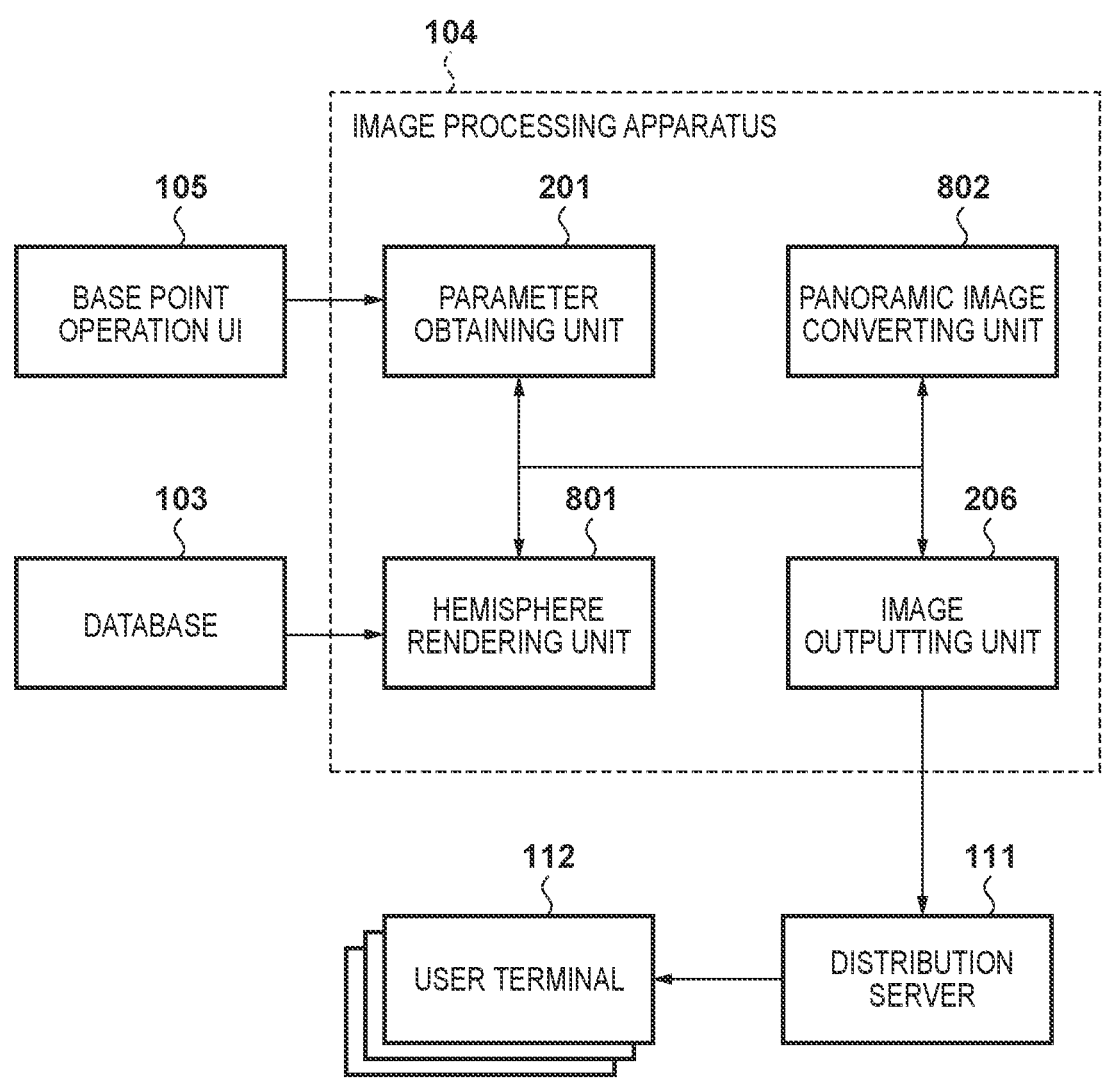
FIG. 8 is a block diagram illustrating an exemplary functional configuration of an image processing apparatus according to a fifth embodiment.

The functional configuration of an image processing apparatus 104 in the fifth embodiment will be described with reference to FIG. 8. A parameter obtaining unit 201 and an image outputting unit 206 are similar to those in the first embodiment (FIG. 2A). In the fifth embodiment, a so-called fish-eye image is rendered as a virtual viewpoint image to be rendered, based on a multi-viewpoint image, that is observed from a position that is the base point of a panoramic image. A hemisphere rendering unit 801 renders an image, as a virtual viewpoint image, on an inner face of a hemisphere with the base point coordinate being the center, based on a multi-viewpoint image obtained from the database 103. The hemisphere rendering unit 801 performs rendering processing using a mapping table in which the pixels on a hemisphere inner face are mapped to pixels of the multi-viewpoint image. The hemisphere rendering processing will be described later with reference to FIG. 9. A panoramic image converting unit 802 converts a hemisphere image output from the hemisphere rendering unit 801 to a panoramic image. This conversion processing will be described later with reference to FIG. 9. The hardware configuration of the image processing apparatus 104 is similar to that in the first embodiment (FIG. 2B).

(Generating Processing of Panoramic Image)

Figure 10A:
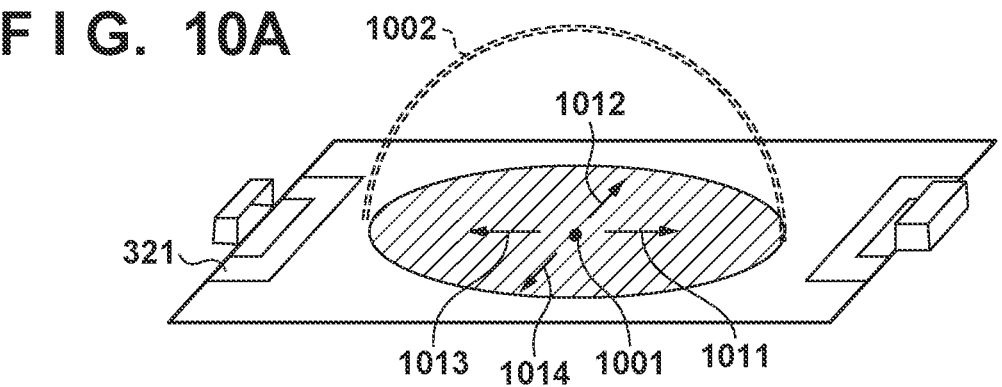
FIG. 10A is a diagram illustrating an exemplary output of a panoramic image according to the fifth embodiment.
Figure 10B:
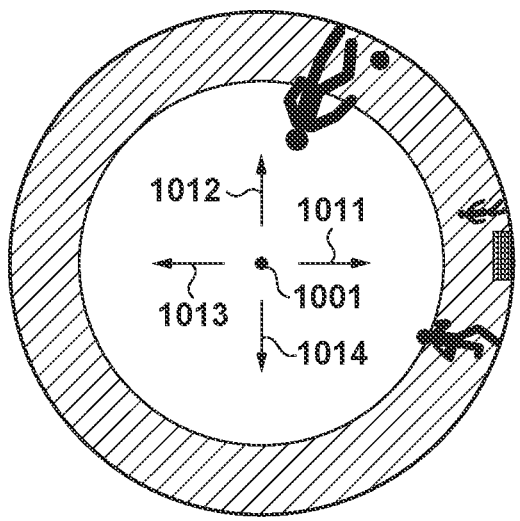
FIG. 10B is a diagram illustrating an exemplary output of a panoramic image according to the fifth embodiment.

The generating processing of panoramic image in the present embodiment will be described with reference to FIGS. 9 and 10A to 10C. FIG. 9 is a flowchart illustrating the generating processing of a panoramic image according to the fifth embodiment. FIG. 10A shows an example of a hemisphere to be set so as to include at least a portion of the imaging region, and FIG. 10B shows a hemisphere image to be rendered on an inner face of the hemisphere. In the example in FIG. 10A, a field 321 of a stadium is the imaging region, and a hemisphere 1002 is set with a base point coordinate 1001 being the center. The coordinate system is similar to the coordinate system described in FIGS. 3A and 3B. For example, the base point coordinate 1001 is set to the origin (0, 0, 0).

In step S901, the panoramic image converting unit 802 reads out a conversion table for performing conversion from a multi-viewpoint image to s hemisphere image from a RAM 212 or the like. The conversion table is a table for managing the mapping between pixels on an inner face of the hemisphere 1002 whose center is the base point coordinate 1001 and pixels included in one multi-viewpoint image obtained by image capturing performed by one camera included in a sensor system 101.

Although description of the mapping will not be given regarding all pixels, a rough mapping is shown in FIGS. 10A and 10B. In both diagram of FIGS. 10A and 10B, each of vectors 1011 to 1014 pointing from the base point coordinate 1001 to the hemisphere inner face is the same. For example, the vector 1011 is in an x axis direction that is set in parallel to the long axis of the field, and indicates a right goal direction in the diagram. If the vector 1011 is in the frontal direction, the vector 1012 indicates a y axis direction (leftward direction), the vector 1013 indicates a −x axis direction (dorsal direction), and the vector 1014 indicates a −y axis direction (rightward direction).

Note that when the base point coordinate 1001 of the hemisphere 1002 is changed, or the position or orientation of the camera included in each sensor of the sensor system 101 is changed, the mapping table needs to be changed. That is, the conversion table indicating the mapping between the pixels of the multi-viewpoint image and the pixels of the hemisphere inner face is generated for each base point coordinate, and is stored in the RAM 212 or the like. The panoramic image converting unit 802 selects and uses a conversion table corresponding to a set reference point.

Note that, in the example in FIG. 10B, the base point coordinate 1001 at the center is the origin, and a planar part (ground such as a field) of the hemisphere 1002 is not displayed. Depending on the base point coordinate 1001, it is possible to map pixels included in an image obtained by image capturing performed by at least one camera included in the sensor system 101 to the planar part of the hemisphere 1002 as well.

Figure 10C:
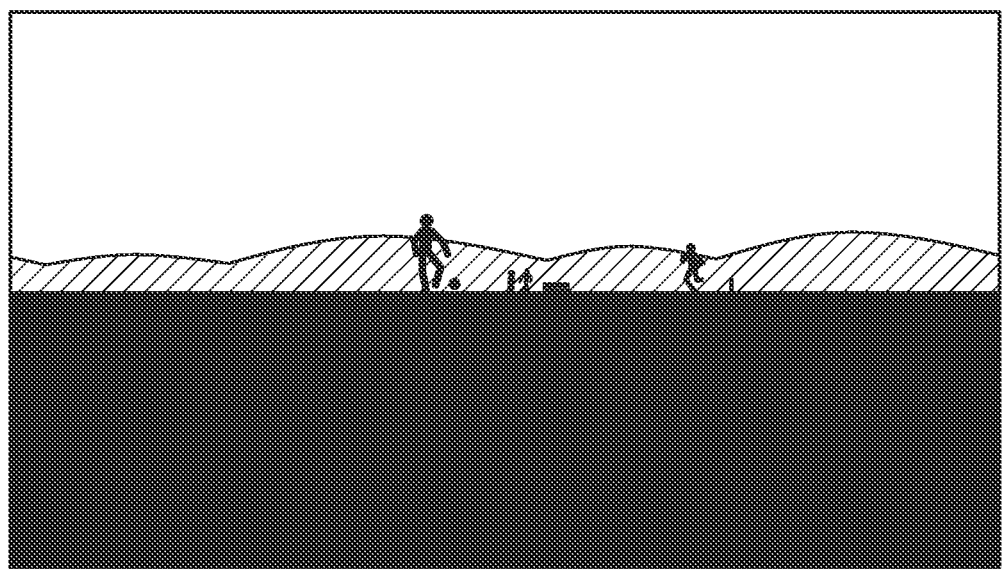
FIG. 10C is a diagram illustrating an exemplary output of a panoramic image according to the fifth embodiment.

In steps S902, S903, and S904, the panoramic image converting unit 802, for each pixel of a hemisphere image to be generated, reads out a corresponding pixel value of a multi-viewpoint image in the conversion table obtained in step S901, and sets the value. In step S905, the panoramic image converting unit 802 converts the hemisphere image into a panoramic image. The hemisphere image is also called as a fish-eye image, and can be generated using a known panoramic image conversion. The panoramic image obtained by conversion is shown in FIG. 10C. Note that pixels, in the hemisphere image, that are not in mapping relationship with multi-viewpoint image may be displayed in black in the panoramic image.

The format of the panoramic image can be similar to that of the panoramic image in the first embodiment (FIGS. 6B and 6D), and the panoramic image can be transmitted to a distribution server 111, and viewed in a user terminal 112, similarly to the first embodiment.

As described above, according to the fifth embodiment, different from the first to fourth embodiments, a panoramic image can be generated using a multi-viewpoint image obtained by image capturing performed by a plurality of cameras that are arranged so as to surround the imaging region, without rendering a plurality of virtual viewpoint images corresponding to a plurality of virtual viewpoints that are different in line of sight direction.

As described above, according to the embodiments described above, a panoramic image can be generated using a multi-viewpoint image obtained by performing synchronized image capturing from different positions using a plurality of cameras. Also, a simple operation is also provided in order to designate any position in the imaging region as the base point of a panoramic image. Therefore, according to the embodiments described above, even in a place into which the image capture apparatus cannot be brought, a user can designate any position by a simple operation, and a panoramic image of which the designated position is the base point can be generated. For example, in the middle of a sport game in a stadium, a panoramic image of which any position in the field is the base point can be generated. Also, in the generated panoramic image, a viewer can select a preferred direction, and view a player and its play in exactly the middle of the game in a close up manner.

According to the above embodiments, a panoramic image with higher degree of freedom can be provided.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image processing apparatus comprising:
one or more memories storing instructions; and
one or more processors executing the instructions to:
    obtain a plurality of images based on image capturing performed by a plurality of image capture apparatuses that perform image capturing of an imaging region from directions that are different to each other;
    set a specific position in the imaging region;
    determine a plurality of virtual viewpoints by determining each of positions of the plurality of virtual viewpoints to coincide with the set specific position and determining view directions from the plurality of virtual viewpoints to be different from each other;
    generate, based on the obtained plurality of images, a plurality of virtual viewpoint images, each of the generated plurality of virtual viewpoint images being corresponding to one of the plurality of virtual viewpoints; and
    generate a panoramic image for the set specific position, based on the generated plurality of virtual viewpoint images.

2. The image processing apparatus according to claim 1, wherein the one or more processors execute the instructions further to generate a three-dimensional shape model of an object in the imaging region based on the obtained plurality of images, and
wherein the plurality of virtual viewpoint images are generated based on the generated three-dimensional shape model.

3. The image processing apparatus according to claim 1, wherein the plurality of virtual viewpoint images include four or more virtual viewpoint images corresponding to four or more directions that are different to each other on a horizontal plane that includes the set specific position and two or more virtual viewpoint images corresponding to two or more directions that are different to each other on a vertical plane that includes the set specific position.

4. The image processing apparatus according to claim 1, wherein the panoramic image is an image in accordance with an equidistant cylindrical projection method.

5. The image processing apparatus according to claim 1, wherein the panoramic image includes images in 360 degree directions on a horizontal plane with the set specific position.

6. The image processing apparatus according to claim 1, wherein the panoramic image is an omnidirectional image.

7. The image processing apparatus according to claim 1, wherein, in the setting, the specific position is set based on a user operation.

8. The image processing apparatus according to claim 7, wherein, in the setting, a position corresponding to a coordinate value that is input according to the user operation is set as the specific position.

9. The image processing apparatus according to claim 7,
wherein the one or more processors execute the instructions further to cause a display device to display a bird's-eye view image of the imaging region, and
wherein, in the setting, the specific position is set based on a designated position according to the user operation on the bird's-eye view image displayed in the display device.

10. The image processing apparatus according to claim 9, wherein
the display device is a touch panel display, and
in the setting, the specific position is set using, as the designated position, a position of a touch input to the touch panel display that displays the bird's-eye view image.

11. The image processing apparatus according to claim 1, wherein, in the setting, the specific position is set according to a position of an object in the imaging region.

12. The image processing apparatus according to claim 11,
wherein the one or more processors execute the instructions further to cause a display device to display a bird's-eye view image of the imaging region, and
wherein, in the setting, a position according to an object that is selected based on a user operation, among a plurality of objects included in the bird's-eye view image that is displayed in the display device, is set as the specific position.

13. The image processing apparatus according to claim 1, wherein a view direction corresponding to an initial display of the generated panoramic image is determined based on an orientation of a virtual camera that is operated by a user, or an orientation of an object in the imaging region.

14. The image processing apparatus according to claim 1, wherein the set specific position is a position different from positions of the plurality of image capture apparatuses.

15. The image processing apparatus according to claim 1,
wherein the one or more processors execute the instructions further to continuously move the set specific position, and
wherein a panoramic image of a moving image according to a movement of the set specific position is generated.

16. An image processing apparatus comprising:
one or more memories storing instructions; and
one or more processors executing the instructions to:
obtain a plurality of images based on image capturing performed by a plurality of image capture apparatuses that perform image capturing of an imaging region from directions that are different to each other and that are arranged so as to surround the imaging region;
set a specific position in the imaging region;
generate a fish-eye image centered on the set specific position by projecting the obtained plurality of images on an inner face of a hemisphere whose center is the set specific position using a conversion table managing mapping between pixels on the inner face of the hemisphere and pixels of the plurality of image capture apparatuses; and
generate a panoramic image for the set specific position, based on the generated fish-eye image.

17. A control method of an image processing apparatus, comprising:
obtaining a plurality of images based on image capturing performed by a plurality of image capture apparatuses that perform image capturing of an imaging region from directions that are different to each other;
setting a specific position in the imaging region;
determining a plurality of virtual viewpoints by determining each of positions of the plurality of virtual viewpoints to coincide with the set specific position and determining view directions from the plurality of virtual viewpoints to be different from each other;
generating, based on the obtained plurality of images, a plurality of virtual viewpoint images, each of the generated plurality of virtual viewpoint images being corresponding to one of the plurality of virtual viewpoints; and
generating a panoramic image for the set specific position, based on the generated plurality of virtual viewpoint images.

18. A non-transitory computer-readable storage medium storing a program for causing a computer to execute a control method of an image processing apparatus, comprising:
obtaining a plurality of images based on image capturing performed by a plurality of image capture apparatuses that perform image capturing of an imaging region from directions that are different to each other;
setting a specific position in the imaging region;
determining a plurality of virtual viewpoints by determining each of positions of the plurality of virtual viewpoints to coincide with the set specific position and determining view directions from the plurality of virtual viewpoints to be different from each other;
generating, based on the obtained plurality of images, a plurality of virtual viewpoint images, each of the generated plurality of virtual viewpoint images being corresponding to one of the plurality of virtual viewpoints, wherein; and
generating a panoramic image for the set specific position, based on the plurality of images obtained in the obtaining.

19. A control method of an image processing apparatus, comprising:
obtaining a plurality of images based on image capturing performed by a plurality of image capture apparatuses that perform image capturing of an imaging region from directions that are different to each other and that are arranged so as to surround the imaging region;
setting a specific position in the imaging region;
generating a fish-eye image centered on the set specific position by projecting the obtained plurality of images on an inner face of a hemisphere whose center is the set specific position using a conversion table managing mapping between pixels on the inner face of the hemisphere and pixels of the plurality of image capture apparatuses; and
generating a panoramic image for the set specific position, based on the generated fish-eye image.

20. A non-transitory computer-readable storage medium storing a program for causing a computer to execute a control method of an image processing apparatus, comprising:
obtaining a plurality of images based on image capturing performed by a plurality of image capture apparatuses that perform image capturing of an imaging region from directions that are different to each other and that are arranged so as to surround the imaging region;
setting a specific position in the imaging region;
generating a fish-eye image centered on the set specific position by projecting the obtained plurality of images on an inner face of a hemisphere whose center is the set specific position using a conversion table managing mapping between pixels on the inner face of the hemisphere and pixels of the plurality of image capture apparatuses; and
generating a panoramic image for the set specific position, based on the generated fish-eye image.

* * * * *